US010628936B2

United States Patent
Ishiyama et al.

(10) Patent No.: US 10,628,936 B2
(45) Date of Patent: Apr. 21, 2020

(54) INDIVIDUAL IDENTIFIER EXTRACTION DEVICE

(71) Applicant: NEC CORPORATION, Tokyo (JP)

(72) Inventors: Rui Ishiyama, Tokyo (JP); Toru Takahashi, Tokyo (JP); Yuta Kudo, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 78 days.

(21) Appl. No.: 15/764,915

(22) PCT Filed: Sep. 28, 2016

(86) PCT No.: PCT/JP2016/078603
§ 371 (c)(1),
(2) Date: Mar. 30, 2018

(87) PCT Pub. No.: WO2017/057448
PCT Pub. Date: Apr. 6, 2017

(65) Prior Publication Data
US 2018/0286033 A1 Oct. 4, 2018

(30) Foreign Application Priority Data
Oct. 2, 2015 (JP) ................. 2015-196938

(51) Int. Cl.
G06T 7/00 (2017.01)
G06T 7/30 (2017.01)
(Continued)

(52) U.S. Cl.
CPC ........ *G06T 7/0006* (2013.01); *G06K 9/00577* (2013.01); *G06T 7/30* (2017.01); *G09F 3/02* (2013.01); *G09F 2003/0229* (2013.01)

(58) Field of Classification Search
CPC ...... G06T 7/0006; G06T 7/30; G06K 9/00577
See application file for complete search history.

(56) References Cited

U.S. PATENT DOCUMENTS

2002/0170683 A1* 11/2002 Tamai ................. B65H 37/007
156/574
2008/0197620 A1 8/2008 Spencer et al.
(Continued)

FOREIGN PATENT DOCUMENTS

JP 2002-337830 A 11/2002
JP 2005-161585 A 6/2005
(Continued)

OTHER PUBLICATIONS

International Search Report for PCT/JP2016/078603 dated Dec. 13, 2016 [PCT/ISA/210].

*Primary Examiner* — David F Dunphy
(74) *Attorney, Agent, or Firm* — Sughrue Mion, PLLC

(57) ABSTRACT

An individual identifier extraction device includes: an imaging part configured to obtain an image by imaging a label which is attached to an object and includes a random pattern and an alignment reference portion; and an extraction part configured to acquire, from the image obtained by imaging, an image of an area determined with reference to the alignment reference portion on the label, and extract a feature quantity of the random pattern as an individual identifier of the object from the image of the area.

5 Claims, 24 Drawing Sheets

(51) Int. Cl.
G09F 3/02 (2006.01)
G06K 9/00 (2006.01)

(56) References Cited

U.S. PATENT DOCUMENTS

2014/0086474 A1* 3/2014 Le .................... G06K 9/00577
                                                            382/141
2015/0048156 A1* 2/2015 Cleary ................ G03G 21/046
                                                            235/375

FOREIGN PATENT DOCUMENTS

| JP | 2007-534067 A  | 11/2007 |
| JP | 2013-069188 A  | 4/2013  |
| JP | 2013-190478 A  | 9/2013  |
| JP | 2014-006840 A  | 1/2014  |
| JP | 2014-029678 A  | 2/2014  |
| WO | 2013/018614 A1 | 2/2013  |

* cited by examiner

FIG. 11

| INDIVIDUAL IDENTIFIER | ATTRIBUTE VALUE 1 | ATTRIBUTE VALUE 2 | ... |
|---|---|---|---|
| 10110···001 | PQ001 | 18564 | ... |
| 01101···101 | QR003 | 18564 | ... |
| ⋮ | ⋮ | ⋮ | ⋮ |

FIG. 24

| SERIAL NUMBER | INDIVIDUAL IDENTIFIER |
|---|---|
| 0001 | 10110···001 |
| 0002 | 01101···101 |
| ⋮ | ⋮ |

INDIVIDUAL IDENTIFIER EXTRACTION DEVICE

CROSS REFERENCE TO RELATED APPLICATIONS

This application is a National Stage of International Application No. PCT/JP2016/078603, filed on Sep. 28, 2016, which claims priority from Japanese Patent Application No. 2015-196938, filed on Oct. 2, 2015.

TECHNICAL FIELD

The present invention relates to an individual identifier extraction device, an individual identifier extraction method, a program, an individual identifier registration device, an individual identifier registration method, an identification and verification device, an identification and verification method, an individual identifier management system, an individual identifier management method, and an individual identification tape.

BACKGROUND ART

As individual identification techniques for identifying the identify of an object such as an industrial product and a commercial product, various kinds are proposed and practically used; for example, a barcode, a serial number, and an IC tag. One of the individual identification technique is a technique to extract a feature quantity from an image obtained by imaging a random pattern on an object and consider the extracted feature quantity as an individual identifier of the object.

For example, Patent Documents 1, 2 and 3 describe techniques to use taggant (an additive for tracking) as fine particles, form a pattern containing the taggant on an object, image a predetermined area of the pattern, and consider the distribution of the particles in the predetermined area extracted from the image obtained by imaging as a feature quantity (an individual identifier of the object).

To be specific, in Patent Document 1, a taggants distributed pattern is formed entirely or partially on the surface of a reference object by applying printing ink containing taggants, and a feature quantity extracted from an image obtained by reading the taggants distributed layer is considered as an individual identifier of the reference object. At the time of verification of a target object, under the same reading conditions such as the orientation, position and range of reading as those for reading the reference object, an image of a taggants distributed pattern on the target object is read, and a feature quantity extracted from the image is compared with the individual identifier of the reference object.

Further, in Patent Document 2, an origin which becomes a reference for alignment is set on each object, a feature quantity is extracted from a predetermined area of a two-dimensional plane on which a rightward direction from the origin is a positive direction of an X-axis and a downward direction from the origin is a positive direction of a Y-axis, and the extracted feature quantity is considered as an individual identifier of the object. Herein, as the shape of the predetermined area, a rectangle, a circle, an ellipse, a polygon and another specific shape are shown as examples.

Further, in Patent Document 3, a reference portion is put on an object (the reference portion is, for example, an alignment mark, a line, a company logo, a frame, and an edge or a combination of edges of the object), and a coating material containing taggants, or the like, is sprayed and a random pattern is attached so as to completely cover at least the reference portion. Then, a feature quantity depending on the distribution of taggants is extracted from an image of the reference portion and is considered as an individual identifier of the object.

Further, a technique to perform individual identification by using a subtle difference of a product surface pattern for each individual is proposed. For example, in Patent Document 4, a feature quantity is extracted from an image of a predetermined area on a product defined with reference to a reference portion, which exists in common on products, and the extracted feature quantity is considered as an individual identifier of the product.

Furthermore, a technique disclosed by Patent Document 5 is a technique related to the present invention. In Patent Document 5, a label having a unique pattern is given to an object. Each label is manufactured by cutting a sheet or a film made of a polymer or the like having a unique pattern into a predetermined size. Moreover, each label has an identifier formed by a trademark or a logo.

Patent Document 1: Japanese Unexamined Patent Application Publication No. JP-A 2013-069188
Patent Document 2: Japanese Unexamined Patent Application Publication No. JP-A 2014-006840
Patent Document 3: Japanese Unexamined Patent Application Publication (Translation of PCT Application) No. JP-A 2007-534067
Patent Document 4: Re-publication of PCT International Publication No. WO2013/018614
Patent Document 5: US Patent Application Publication No. US2008/0197620A1

However, it is difficult to universally apply the above-mentioned techniques disclosed by Patent Documents 1 to 4 to plural kinds of objects having different outer shapes and sizes from each other. This is because an area to extract a feature quantity is defined with reference to a reference portion on an object in the techniques disclosed by Patent Documents 1 to 4 and a portion which can be a reference portion on an object differs with the outer shape and size of an object.

On the other hand, the technique disclosed by Patent Document 5 can be applied to any objects that labels can be attached even if the outer shapes and sizes of the objects are different from each other. However, Patent Document 5 does not have an idea of "an area on a label defined with reference to some kind of reference portion" and therefore requires verification of a feature quantity extracted from an image of the whole label. Consequently, in a case where an object surface with a label attached has a color, a material, a pattern or the like which is hard to be visually distinguished from a pattern of the label, an image of the whole label cannot be specified and extraction of a feature quantity fails.

SUMMARY

An object of the present invention is to provide an individual identifier extraction device that solves the above problems.

An individual identifier extraction device according to an exemplary embodiment of the present invention includes:
an imaging part configured to obtain an image by imaging a label attached to an object, the label including a random pattern and an alignment reference portion; and
an extraction part configured to acquire an image of an area on the label from the image obtained by imaging, and extract a feature quantity of the random pattern as an individual identifier of the object from the image of the area, the area being determined with reference to the alignment reference portion.

An individual identifier extraction method according to another exemplary embodiment of the present invention includes:

obtaining an image by imaging a label attached to an object, the label including a random pattern and an alignment reference portion;

acquiring an image of an area on the label from the image obtained by imaging, the area being determined with reference to the alignment reference portion; and extracting a feature quantity of the random pattern as an individual identifier of the object from the image of the area.

A non-transitory computer-readable medium storing a program according to another exemplary embodiment of the present invention is a non-transitory computer-readable medium storing a program including instructions for causing a computer to function as:

an imaging part configured to obtain an image by imaging a label attached to an object, the label including a random pattern and an alignment reference portion; and an extraction part configured to acquire an image of an area on the label from the image obtained by imaging, and extract a feature quantity of the random pattern as an individual identifier of the object from the image of the area, the area being determined with reference to the alignment reference portion.

A verification device according to another exemplary embodiment of the present invention performs verification by using an individual identifier extracted by the individual identifier extraction device according to the exemplary embodiment of the present invention.

An identification device according to another exemplary embodiment of the present invention performs identification by using an individual identifier extracted by the individual identifier extraction device according to the exemplary embodiment of the present invention.

A verification method according to another exemplary embodiment of the present invention is a verification method of performing verification by using an individual identifier extracted by the individual identifier extraction method according to the exemplary embodiment of the present invention.

An identification method according to another exemplary embodiment of the present invention is an identification method of performing identification by using an individual identifier extracted by the individual identifier extraction method according to the exemplary embodiment of the present invention.

An identification and verification device according to another exemplary embodiment of the present invention includes:

an imaging part configured to obtain an image by imaging a label attached to an object, the label including a random pattern and an alignment reference portion;

an extraction part configured to acquire an image of an area on the label from the image obtained by imaging, and extract a feature quantity of the random pattern as an individual identifier of the object from the image of the area, the area being determined with reference to the alignment reference portion; and a determination part configured to compare the individual identifier of the object with an individual identifier of a registered object stored in a storage part and, on a basis of a comparison result, determine identification and verification of the object.

An identification and verification method according to another exemplary embodiment of the present invention includes:

obtaining an image by imaging a label attached to an object, the label including a random pattern and an alignment reference portion;

acquiring an image of an area on the label from the image obtained by imaging, the area being determined with reference to the alignment reference portion;

extracting a feature quantity of the random pattern as an individual identifier of the object from the image of the area; and comparing the individual identifier of the object with an individual identifier of a registered object stored in a storage part and, on a basis of a comparison result, determining identification and verification of the object.

An individual identifier registration device according to another exemplary embodiment of the present invention includes:

a generation part configured to generate a label to be attached to an object, the label including a random pattern and an alignment reference portion;

an imaging part configured to obtain an image by imaging the label attached to an object; and an extraction part configured to acquire an image of an area on the label from the image obtained by imaging, and extract a feature quantity of the random pattern as an individual identifier of the object from the image of the area, the area being determined with reference to the alignment reference portion.

An individual identifier registration method according to another exemplary embodiment of the present invention includes:

generating a label to be attached to an object, the label including a random pattern and an alignment reference portion;

obtaining an image by imaging the label attached to an object;

acquiring an image of an area on the label from the image obtained by imaging, the area being determined with reference to the alignment reference portion; and extracting a feature quantity of the random pattern as an individual identifier of the object from the image of the area.

An individual identifier management system according to another exemplary embodiment of the present invention includes an individual identifier registration device and an identification and verification device.

The individual identifier registration device has:

a generation part configured to generate a label to be attached to an object, the label including a random pattern and an alignment reference portion;

an imaging part configured to obtain an image by imaging the label attached to an object; and an extraction part configured to acquire an image of an area on the label from the image obtained by imaging, and extract a feature quantity of the random pattern as an individual identifier of the object from the image of the area, the area being determined with reference to the alignment reference portion.

The identification and verification device has:

an imaging part configured to obtain an image by imaging a label attached to an object, the label including a random pattern and an alignment reference portion;

an extraction part configured to acquire an image of an area on the label from the image obtained by imaging, and extract a feature quantity of the random pattern as an individual identifier of the object from the image of the area, the area being determined with reference to the alignment reference portion; and a determination part configured to compare the individual identifier of the object with an individual identifier of a registered object stored in a storage part and, on a basis of a comparison result, determine identification and verification of the object.

An individual identifier management method according to another exemplary embodiment of the present invention includes an individual identifier registration process and an identification and verification process.

The individual identifier registration process includes:

generating a label to be attached to an object, the label including a random pattern and an alignment reference portion;

obtaining an image by imaging the label attached to the object; and acquiring an image of an area on the label from the image obtained by imaging, the area being determined with reference to the alignment reference portion;

extracting a feature quantity of the random pattern as an individual identifier of the object from the image of the area.

The identification and verification process includes:

obtaining an image by imaging a label attached to an object, the label including a random pattern and an alignment reference portion;

acquiring an image of an area on the label from the image obtained by imaging, the area being determined with reference to the alignment reference portion;

extracting a feature quantity of the random pattern as an individual identifier of the object from the image of the area; and comparing the individual identifier of the object with an individual identifier of a registered object stored in a storage part and, on a basis of a comparison result, determining identification and verification of the object.

An individual identification tape according to another exemplary embodiment of the present invention is an individual identification tape formed in a roll shape, and alignment reference portions are formed at intervals over an entire length of a tape surface having a random pattern.

With the configurations described above, the present invention can be universally applied to plural kinds of objects having different outer shapes and sizes from each other. Moreover, according to the present invention, even if an object surface with a label attached has a color, a material, a pattern or the like which is hard to be visually distinguished from a random pattern of the label, extraction of a feature quantity can be performed without difficulty.

BRIEF DESCRIPTION OF DRAWINGS

FIG. 11 is a diagram showing an example of data registered in a storage device in the individual identifier registration device according to the third exemplary embodiment of the present invention;

FIG. 24 is a diagram showing an example of data stored in a storage device in the individual identifier registration device according to the eighth exemplary embodiment of the present invention.

EXEMPLARY EMBODIMENTS

Next, exemplary embodiments of the present invention will be described in detail with reference to the drawings.

First Exemplary Embodiment

Figure 1:
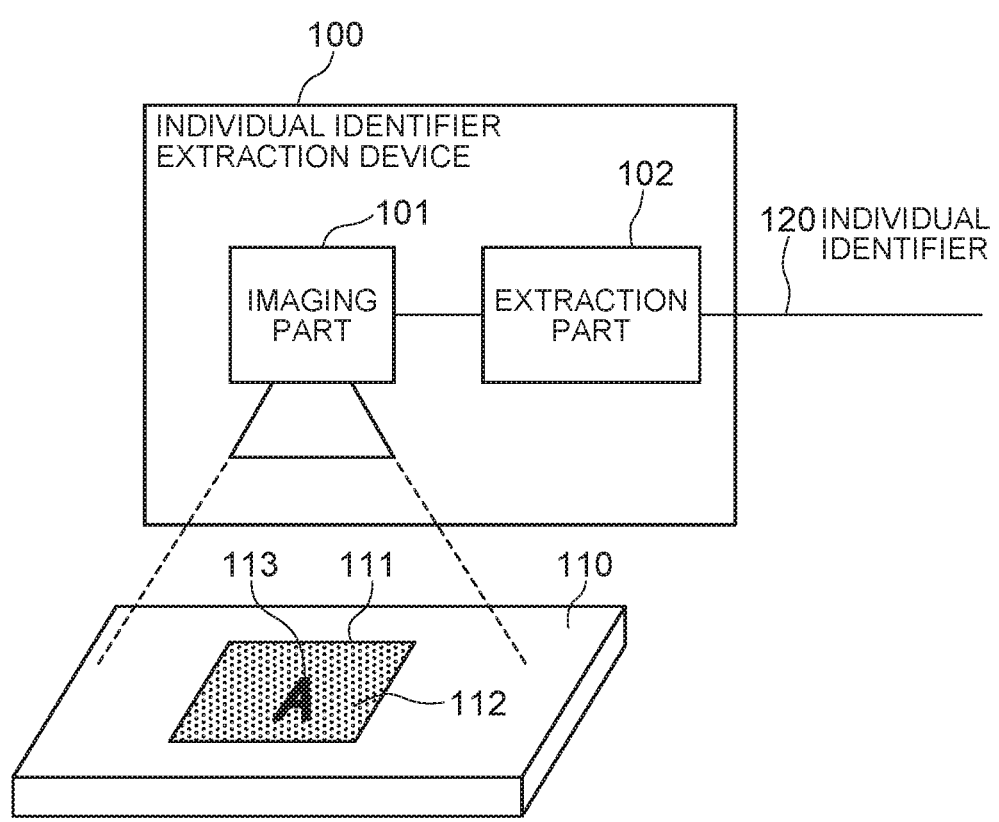
FIG. 1 is a configuration diagram of an individual identifier extraction device according to a first exemplary embodiment of the present invention.

With reference to FIG. 1, an individual identifier extraction device 100 according to a first exemplary embodiment of the present invention has a function to extract an individual identifier 120 of an object 110.

The object 110 is a target to extract an individual identifier. The object 110 is, for example, an industrial product or a product package. Moreover, the object 110 may be personal possessions (a business card, a notebook or the like) or part of an individual's body (for example, a finger). On any face of the object 110, a label 111 is attached.

The label 111 has a random pattern 112 and an alignment reference portion 113 on a face opposite a face contacting the object 110.

Although it is preferable that the random pattern 112 is applied entirely to the one face of the label 111, the random pattern 112 may be applied partially to the one face of the label. The random pattern 112 can be formed by, for example, applying and solidifying printing ink, paint or the like containing fine particles onto a support of the label 111. As the fine particles, fine particles such as metal powder and glass powder, taggant described in Patent Documents 1 to 3 or the like can be used. It is preferable that the fine particles are particles having a different reflection characteristic from a material forming the random pattern 112 (except the fine particles). Moreover, it is preferable that the fine particles are ununiformly contained by the random pattern 112. Otherwise, the random pattern 112 may be applied to one face of the support of the label 111 by a laser processing machine. Otherwise, in a case where the surface of the support of the label 111 has a random pattern of satin finish or the like, the random pattern 112 may be formed with the use of the satin finish or the like.

The alignment reference portion 113 is a reference for determining an area to extract a feature quantity used as an individual identifier. In the example shown in FIG. 1, a logo (logotype) of an upper-case alphabetical letter "A" is used as the alignment reference portion 113. Meanwhile, as the alignment reference portion 113, a letter other than "A", a figure, a symbol, a three-dimensional shape or a combination of the above, a combination of the above and a color, or the like can be used. However, it is preferable that a letter or the like which is not point symmetric is used as a letter or the like used as the alignment reference portion 113. The alignment reference portion 113 may be applied by, for example, printing a letter or the like onto the random pattern 112 on the label 111. Moreover, it is preferable that the alignment reference portion 113 has a different reflection characteristic from that of the random pattern 112.

The individual identifier extraction device 100 has an imaging part 101 and an extraction part 102 as major function parts.

The imaging part 101 has a function to image the label 111 on the object 110. The imaging part 101 images the label 111 at a predetermined angle. For example, the imaging part 101 images the label 111 from directly above it.

The extraction part 102 has a function to acquire an image of an area on the label 111 determined with reference to the alignment reference portion 113 from an image obtained by the imaging part 101 by imaging. Moreover, the extraction part 102 has a function to extract a feature quantity of the random pattern 111 from the acquired image of the area and output the extracted feature quantity as the individual identifier 120 of the object 110.

Figure 2:
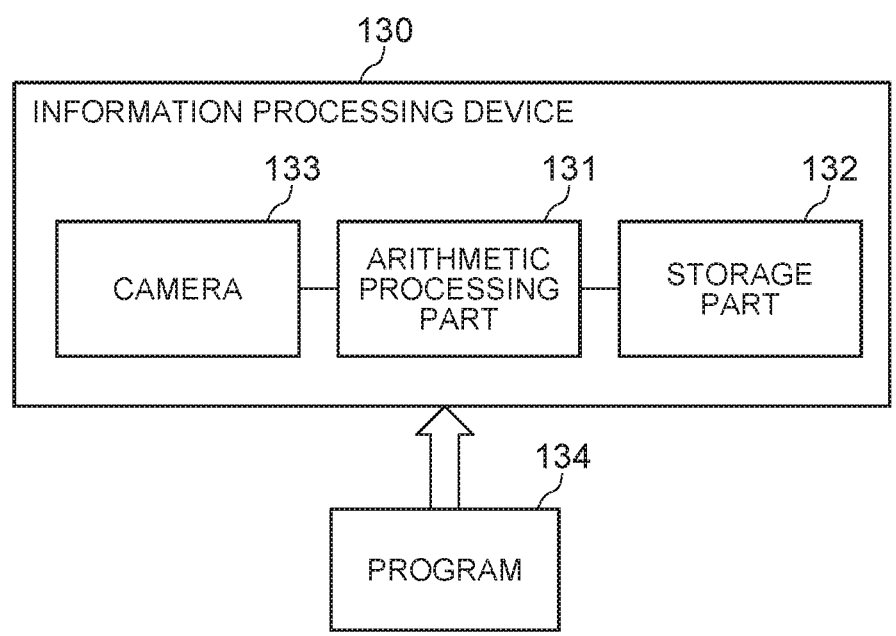
FIG. 2 is a block diagram of an information processing device realizing the individual identifier extraction device according to the first exemplary embodiment of the present invention.

The individual identifier extraction device 100 can be realized by an information processing device 130 and a program 134, for example, as shown in FIG. 2. The information processing device 130 includes an arithmetic processing part 131 such as one or more microprocessors, a storage part 132 such as a memory and a hard disk, and a camera 133. The information processing device 130 may be, for example, a smartphone. The program 134 is loaded from an external computer-readable recording medium to the memory, for example, at the time of start-up of the information processing device 130, and controls the operation of the arithmetic processing part 131 to realize functional units such as the imaging part 101 and the extraction part 102 on the arithmetic processing part 131.

Figure 3:
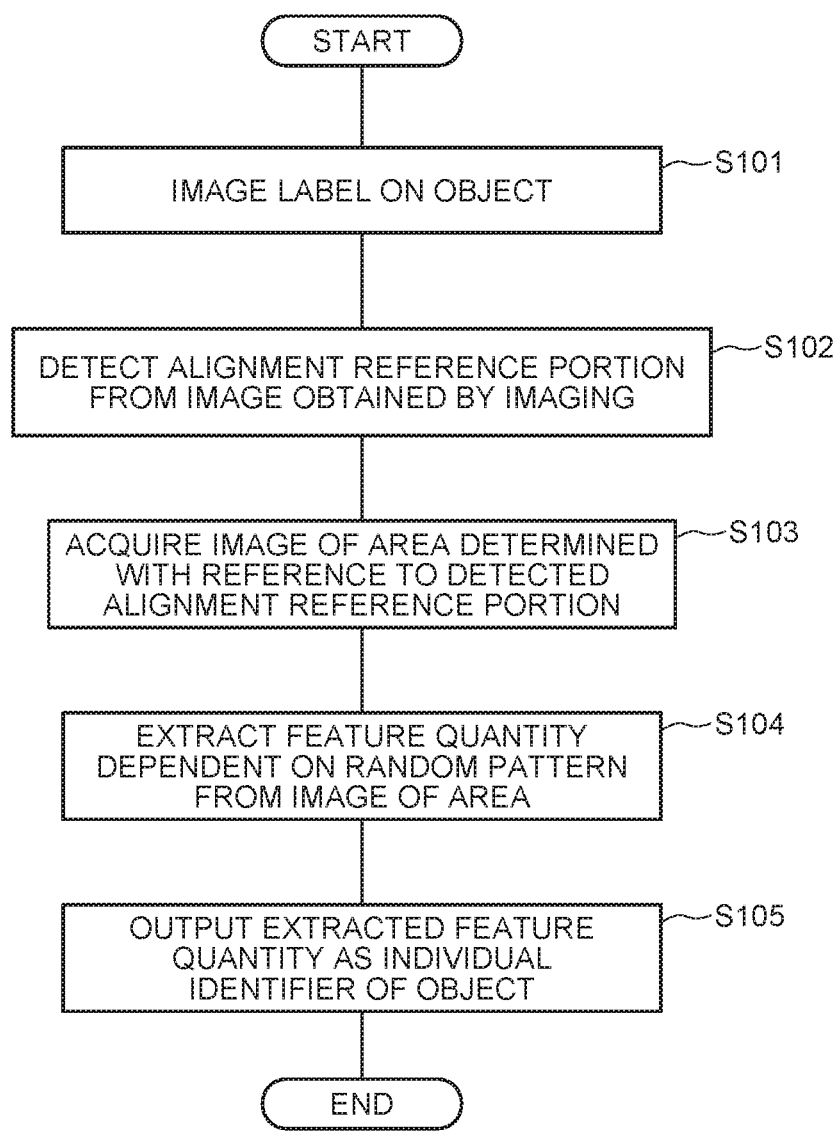
FIG. 3 is a flowchart showing a procedure of an individual identifier extraction method executed by the individual identifier extraction device according to the first exemplary embodiment of the present invention.

FIG. 3 is a flowchart showing a procedure of an individual identifier extraction method executed by using the individual identifier extraction device 100. Below, the individual identifier extraction method according to this exemplary embodiment will be described with reference to FIGS. 1 and 3.

First, the imaging part 101 of the individual identifier extraction device 100 images the label 111 attached onto the object 110 (step S101).

Next, the extraction part 102 of the individual identifier extraction device 100 detects the alignment reference portion 113 from an image obtained by the imaging part 101 by imaging (step S102). For example, the extraction part 102 detects the alignment reference portion 113 by searching the image for the same pattern as a preset alignment reference portion template by using a template matching method. In the example shown in FIG. 1, a logo of an upper-case alphabetical letter "A" is detected as the alignment reference portion. In the example shown in FIG. 1, only a single logo "A" is present on the label 111, so that a single alignment reference portion is detected. In a case where a plurality of logos "A" are present on the label 111, a plurality of alignment reference portions are detected. In such a case where a plurality of alignment reference portions are detected, a single alignment reference portion is selected in accordance with a predetermined rule. For example, in a case where a plurality of logos "A" are lined up in the horizontal direction, a rule of selecting a leftmost logo "A" may be used.

Figure 4:
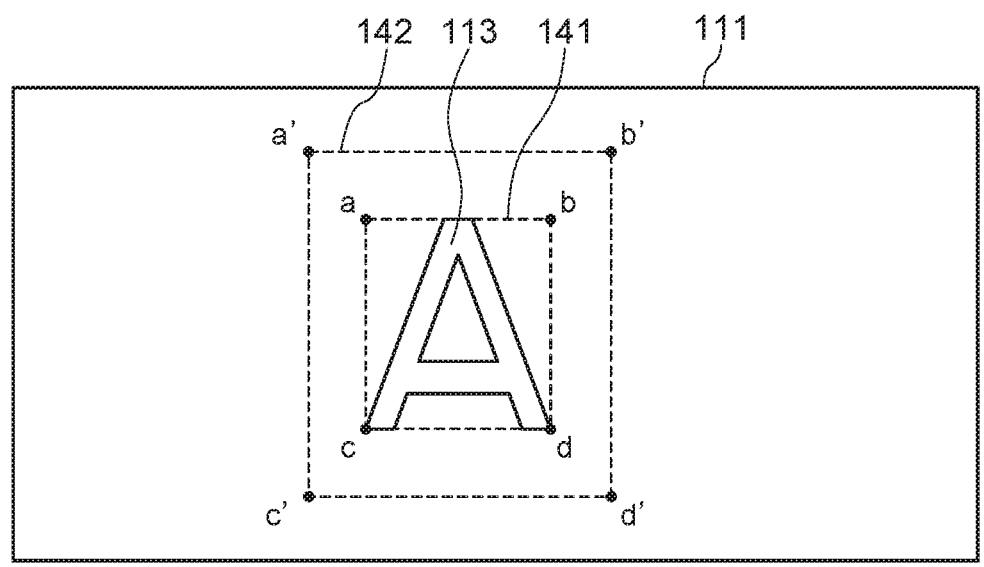
FIG. 4 is a diagram showing an example of an area determined with reference to an alignment reference portion.

Next, the extraction part 102 acquires an image of an area determined with reference to the detected alignment reference portion 113 (step S103). FIG. 4 shows an example of the area determined with reference to the alignment reference portion 113. In this example, a rectangle 142 obtained by enlarging a circumscribed rectangle 141 of the alphabetical letter "A" serving as the alignment reference portion 113 by a predetermined magnification is set as the area determined with reference to the alignment reference portion 113. To be specific, assuming the origin is the lower-left vertex c of the circumscribed rectangle 141, the X axis is a direction from the vertex c to the vertex d, the Y axis is a direction from the vertex c to the vertex a, and the magnification is a, the coordinate values of the vertices a', b', c' and d' of the rectangle 142 are expressed in the following manner with the use of the coordinate values $(x_a, y_a)$, $(x_b, y_b)$, $(x_c, y_c)$ and $(x_d, y_d)$ of the vertices a, b, c and d of the circumscribed rectangle 141.

$$\text{Vertex } a' = (x_a - (\alpha-1)(x_b - x_a)/2, y_a + (\alpha-1)(y_a - y_c)/2)$$

$$\text{Vertex } b' = (x_b + (\alpha-1)(x_b - x_a)/2, y_b + (\alpha-1)(y_b - y_d)/2)$$

$$\text{Vertex } c' = (x_c - (\alpha-1)(x_d - x_c)/2, y_c - (\alpha-1)(y_a - y_c)/2)$$

$$\text{Vertex } d' = (x_d + (\alpha-1)(x_d - x_c)/2, y_d - (\alpha-1)(y_b - y_d)/2)$$

The example shown in FIG. 4 is merely an example. The area determined with reference to the alignment reference portion 113 is not limited to an area completely containing the alignment reference portion 113 as in the example shown in FIG. 4. The area determined with reference to the alignment reference portion 113 may be an area which contains part of the alignment reference portion 113, or may be an area which contains only an area excluding the alignment reference portion 113 on the label 111.

Next, the extraction part 102 extracts a feature quantity dependent on the random pattern 112 from the image acquired from the area determined with reference to the alignment reference portion 113 (step S104). At step S104, the feature quantity dependent on the random pattern 112 is extracted from the image by any method. For example, by using the methods as described in Patent Documents 1 to 3, the feature quantity dependent on the distribution of the particles forming the random pattern 112 may be extracted from the image. Otherwise, the feature quantity may be extracted from the image by using an iris recognition algorithm or another algorithm that is similar thereto.

Next, the extraction part 102 outputs the extracted feature quantity as the individual identifier 120 of the object 110 (step S105).

Thus, according to this exemplary embodiment, it is possible to obtain an individual identifier extraction device and an individual identifier extraction method that can be universally applied to plural kinds of objects having different out shapes and sizes from each other. This is because the label 111 attached to the object 110 is provided with the alignment reference portion 113.

Further, according to this exemplary embodiment, even if a face of the object 110 with the label 111 attached has a color, a material, a pattern or the like that is hard to be visually distinguished from the random pattern 112 of the label 111, it is possible to extract an individual identifier without difficulty. This is because, in this exemplary embodiment, it is not required to specify an image of the whole label 111 and, by specifying the alignment reference portion 113 on the label 111, it is possible to acquire an image of an area on the label 111 to extract a feature quantity with reference to the alignment reference portion.

Second Exemplary Embodiment

Figure 5:
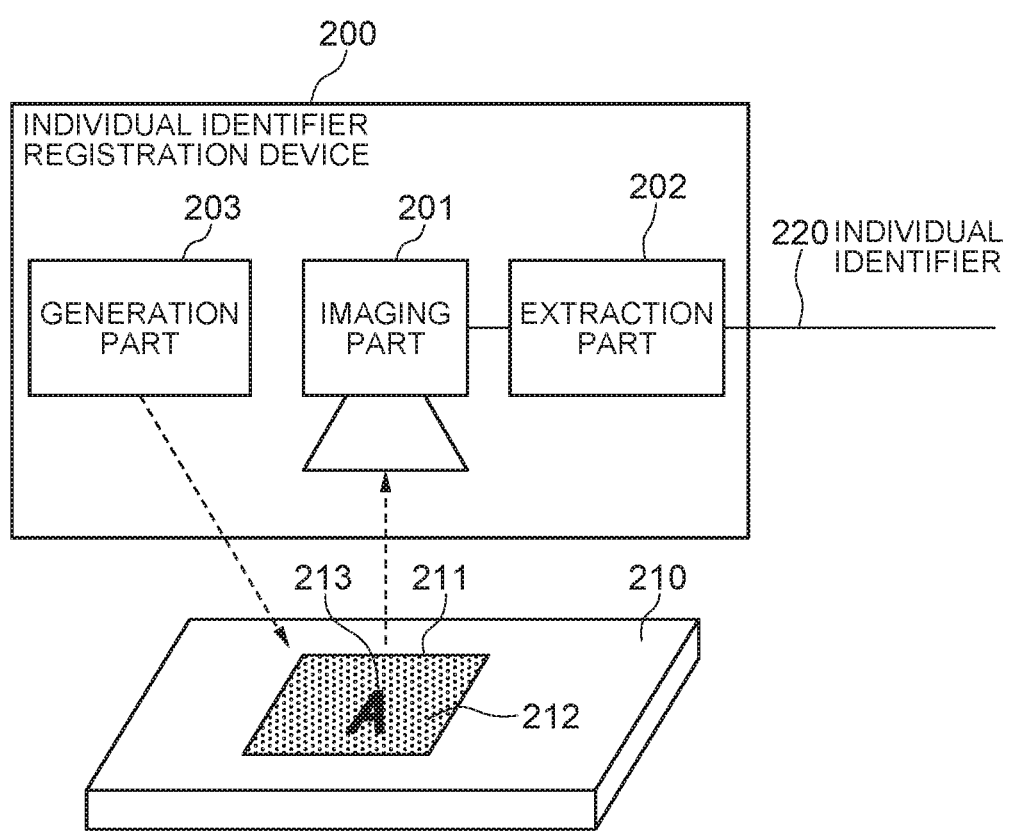
FIG. 5 is a configuration diagram of an individual identifier registration device according to a second exemplary embodiment of the present invention.

With reference to FIG. 5, an individual identifier registration device 200 according to a second exemplary embodiment of the present invention has the same functions as the individual identifier extraction device 100 according to the first exemplary embodiment of the present invention, and also has a function to generate a label 211 to be attached to an object 210.

The object 210 is a target to attach the label 211 and extract an individual identifier. The object 210 is, for example, an industrial product or a product package. Moreover, the object 210 may be personal possessions (a business card, a notebook or the like) or part of an individual's body (for example, a finger).

The individual identifier registration device 200 has an imaging part 201, an extraction part 202 and a generation part 203 as major function parts. Of these parts, the imaging part 201 and the extraction part 202 have the same functions as the imaging part 101 and the extraction part 102 of the individual identifier extraction device 100 according to the first exemplary embodiment.

The generation part 203 has a function to generate the label 211 to be attached to the object 210. The label 211 generated by the generation part 203 includes a random pattern 212 and an alignment reference portion 213 in the same manner as the label 111 attached to the object 110 in the first exemplary embodiment.

Figure 6:
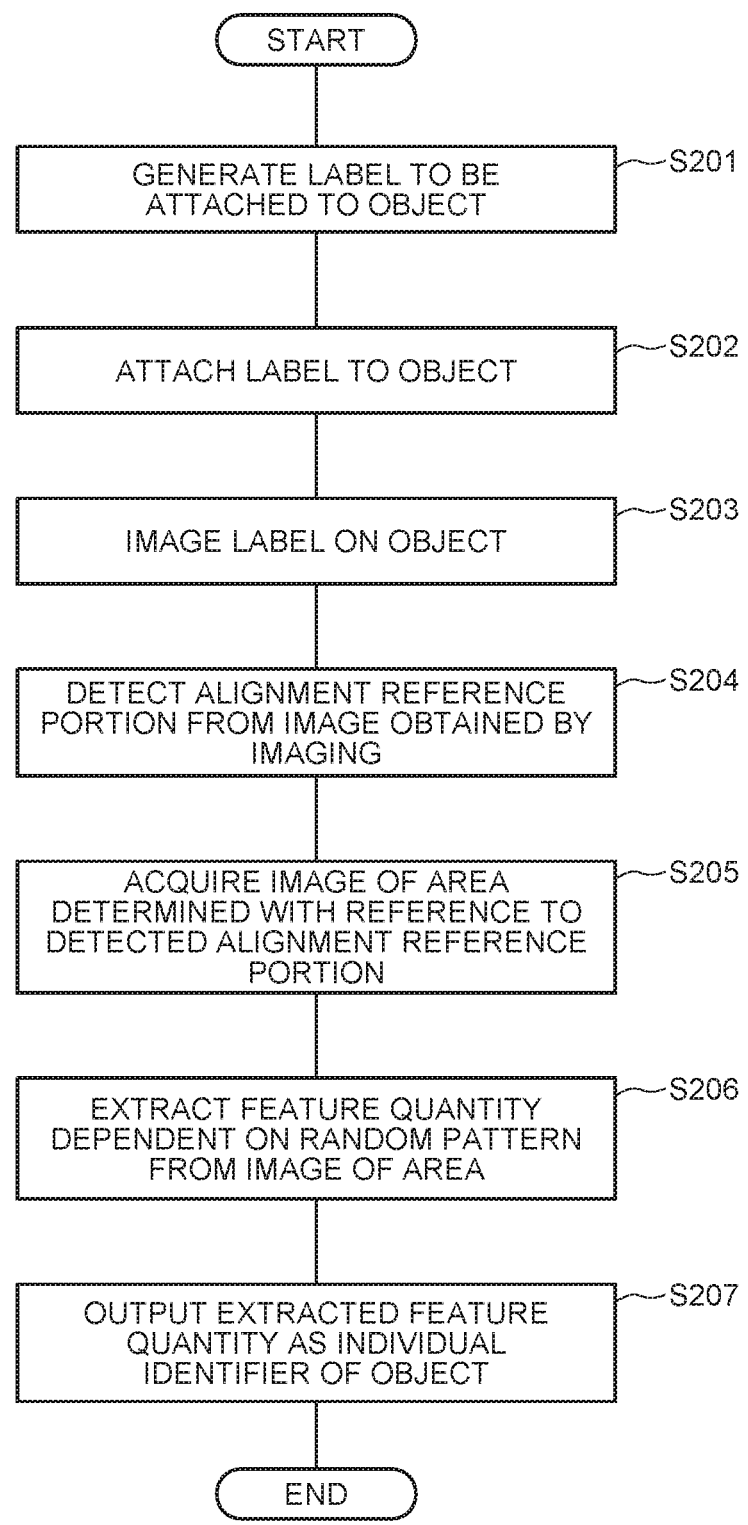
FIG. 6 is a flowchart showing a procedure of an individual identifier registration method executed by the individual identifier registration device according to the second exemplary embodiment of the present invention.

FIG. 6 is a flowchart showing a procedure of an individual identifier registration method executed by using the individual identifier registration device 200. Below, the individual identifier registration method according to this exemplary embodiment will be described with reference to FIGS. 5 and 6.

First, the generation part 203 of the individual identifier registration device 200 generates the label 211 to be attached to the object 210 (step S201). Next, the generation part 203 attaches the generated label 211 to the object 210 (step S202). After that, the imaging part 201 and the extraction part 202 perform operation at steps S203 to S207 that are the same as the steps S101 to S105 of FIG. 3 in the first exemplary embodiment.

Subsequently, a specific example of the generation part 203 will be described.

Figure 7:
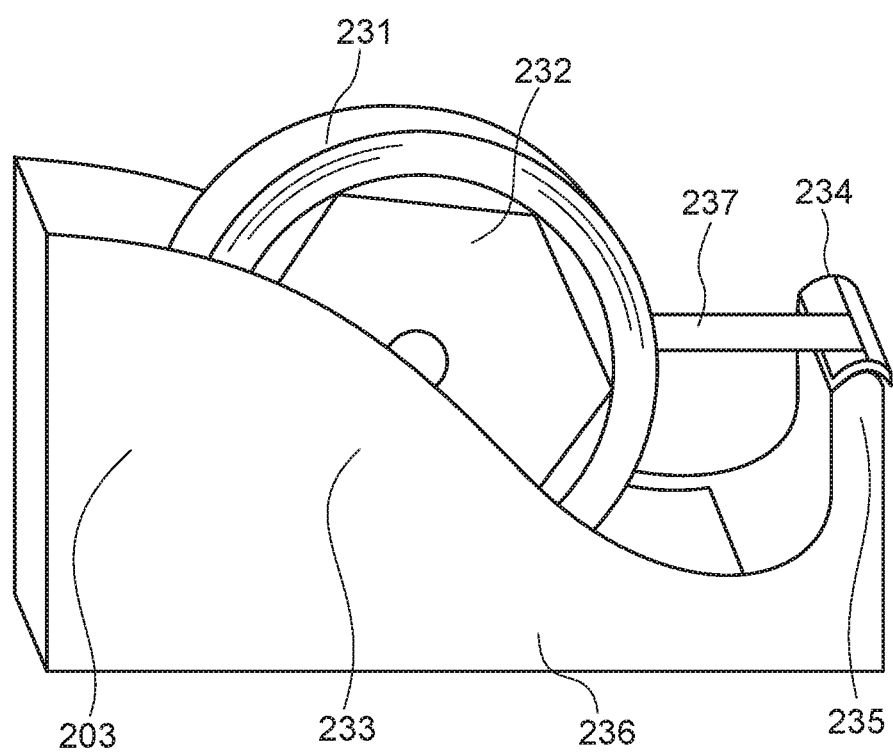
FIG. 7 is an external appearance perspective view showing an example of a generation part in the individual identifier registration device according to the second exemplary embodiment of the present invention.

FIG. 7 is an external appearance perspective view showing an example of the generation part 203. The generation part 203 in this example has a structure that a tape holding part 233 to which a reel 232 loaded with a tape 231 would in a roll form is attached in a rotatable manner and a cutting part 235 having a cutting blade 234 are placed on a base 236, and has a structure that the pulled out tape 237 can be cut to a desired length by pressing against the cutting blade 234. A piece of tape cut from the tape 237 becomes the label 211 to be attached to the object 210.

Figure 8A:
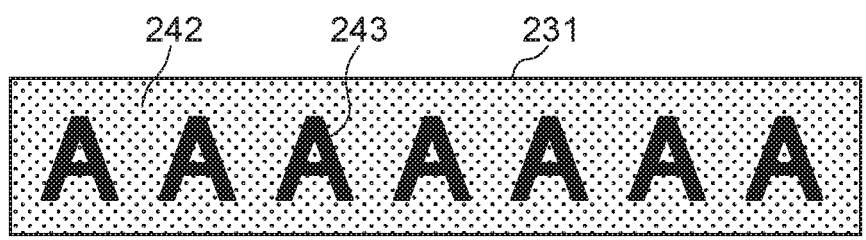
FIGS. 8A and 8B are diagrams showing a front face and a back face of a tape used in the individual identifier registration device according to the second exemplary embodiment of the present invention.
Figure 8B:
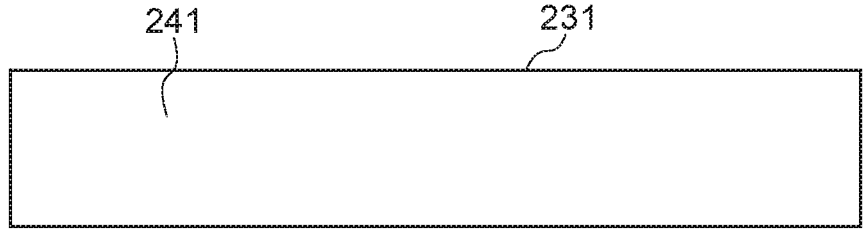

With reference to FIGS. 8A and 8B showing a front face and a back face of the tape 231, an adhesive layer 241 is formed on one face (back face) of a synthetic resin film or the like serving as a support of the tape 231, the random pattern 242 and the alignment reference portion 243 are formed on the other face (front face), and the tape is wound in a roll form so that the adhesive layer 241 is inside. The random pattern 242 may be formed by, for example, applying and solidifying printing ink, paint or the like containing fine particles onto the support of the tape 231. As the fine particles, fine particles such as metal powder and glass powder, taggant described in Patent Documents 1 to 3 or the like can be used. It is preferable that the fine particles are particles having a different reflection characteristic from a material forming the random pattern 242 (except the fine particles). Moreover, it is preferable that the fine particles are ununiformly contained by the random pattern 242. Otherwise, the random pattern 242 may be applied to one face of the support of the tape by a laser processing machine. Otherwise, in a case where the surface of the support of the tape 231 has a random pattern of satin finish or the like, the random pattern 242 may be formed with the use of the satin finish or the like.

The alignment reference portion 243 is a reference for determining an area to extract a feature quantity used as an individual identifier. In the example shown in FIG. 8A, a logo (logotype) of an upper-case alphabetical letter "A" is used as the alignment reference portion 243. Meanwhile, as the alignment reference portion 243, a letter other than "A", a figure, a symbol, a three-dimensional shape or a combination of the above, a combination of the above and a color, or the like can be used. However, it is preferable that a letter or the like which is not point symmetric is used as a letter or the like used as the alignment reference portion 243. The alignment reference portion 243 may be applied by, for example, printing a letter or the like on the random pattern 242 formed on the tape 231. Moreover, it is preferable that the alignment reference portion 243 has a different reflection characteristic from that of the random pattern 242. Moreover, the alignment reference portions 243 are formed at intervals over the entire length of the tape 231. A distance between the adjacent alignment reference portions 243 may be any distance. By making the distance shorter, it is possible to increase the number of the alignment reference portions included in a unit-length label and shorten a required length of a label to that extent.

Thus, according to the generation part 203 in this example, it is possible to generate the label 211 at low cost by pulling out the tape 237 from the roll-shaped tape 231 on which the alignment reference portions 243 are formed at intervals over the entire length of the tape face having the random pattern 242 and cutting the pulled out tape 237 to an appropriate length on the spot.

Third Exemplary Embodiment

Figure 9:
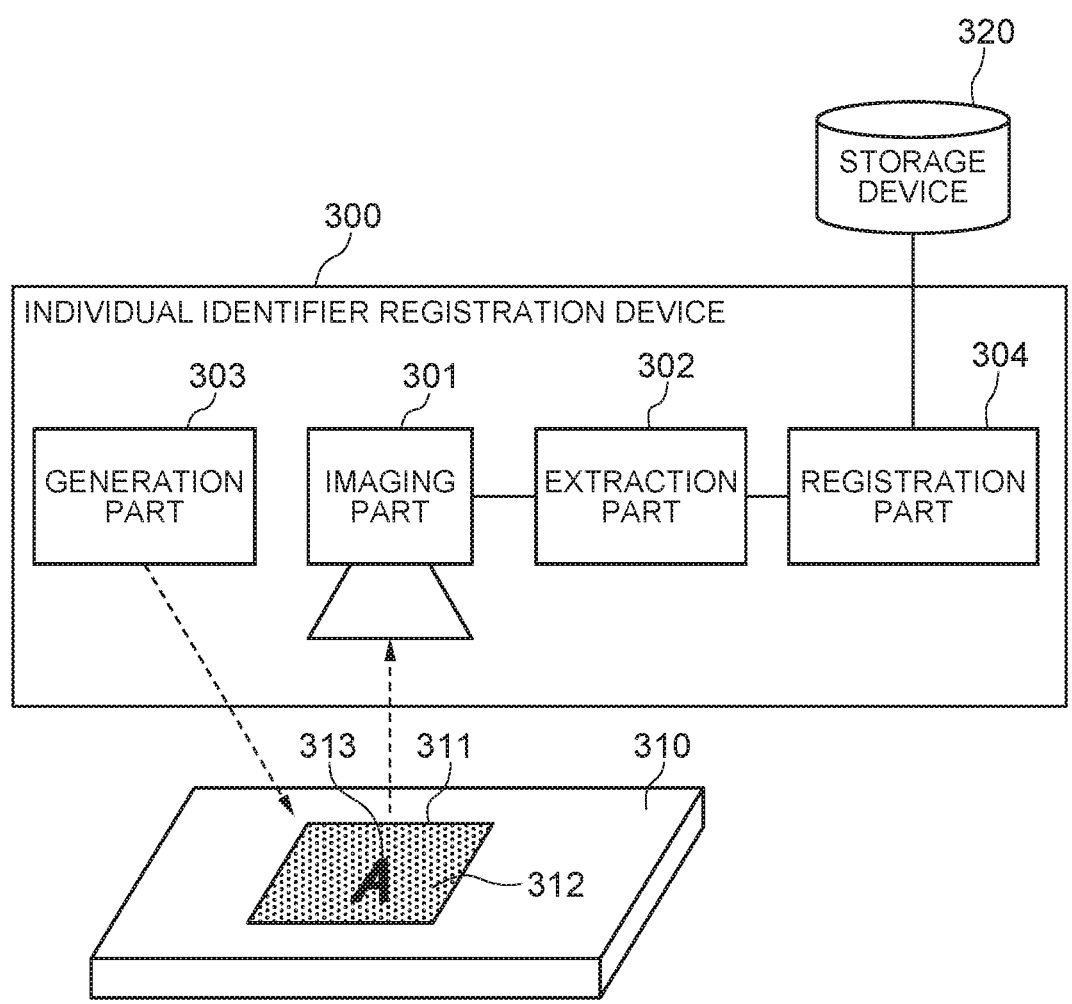
FIG. 9 is a configuration diagram of an individual identifier registration device according to a third exemplary embodiment of the present invention.

With reference to FIG. 9, an individual identifier registration device 300 according to a third exemplary embodiment of the present invention has the same functions as the individual identifier registration device 200 according to the second exemplary embodiment of the present invention, and also has a function to register data including an extracted individual identifier into a storage device 320. Herein, an object 310, a random pattern 311 and an alignment reference portion 313 are the same as the object 210, the random pattern 212 and the alignment reference portion 213 shown in FIG. 5 in the second exemplary embodiment of the present invention.

The individual identifier registration device 300 has an imaging part 301, an extraction part 302, a generation part 303 and a registration part 304 as major function parts. Of these parts, the imaging part 301, the extraction part 302 and the generation part 303 have the same functions as the imaging part 201, the extraction part 202 and the generation part 203 in the second exemplary embodiment.

The registration part 304 has a function to register an individual identifier of the object 310 extracted by the extraction part 302 as an individual identifier of a registered object into a storage device 320. The storage device 320 may be, for example, a storage of a server device that can be accessed by the individual identifier registration device 300 via a network. Otherwise, the storage device 320 may be a local storage device connected to the individual identifier registration device 300.

Figure 10:
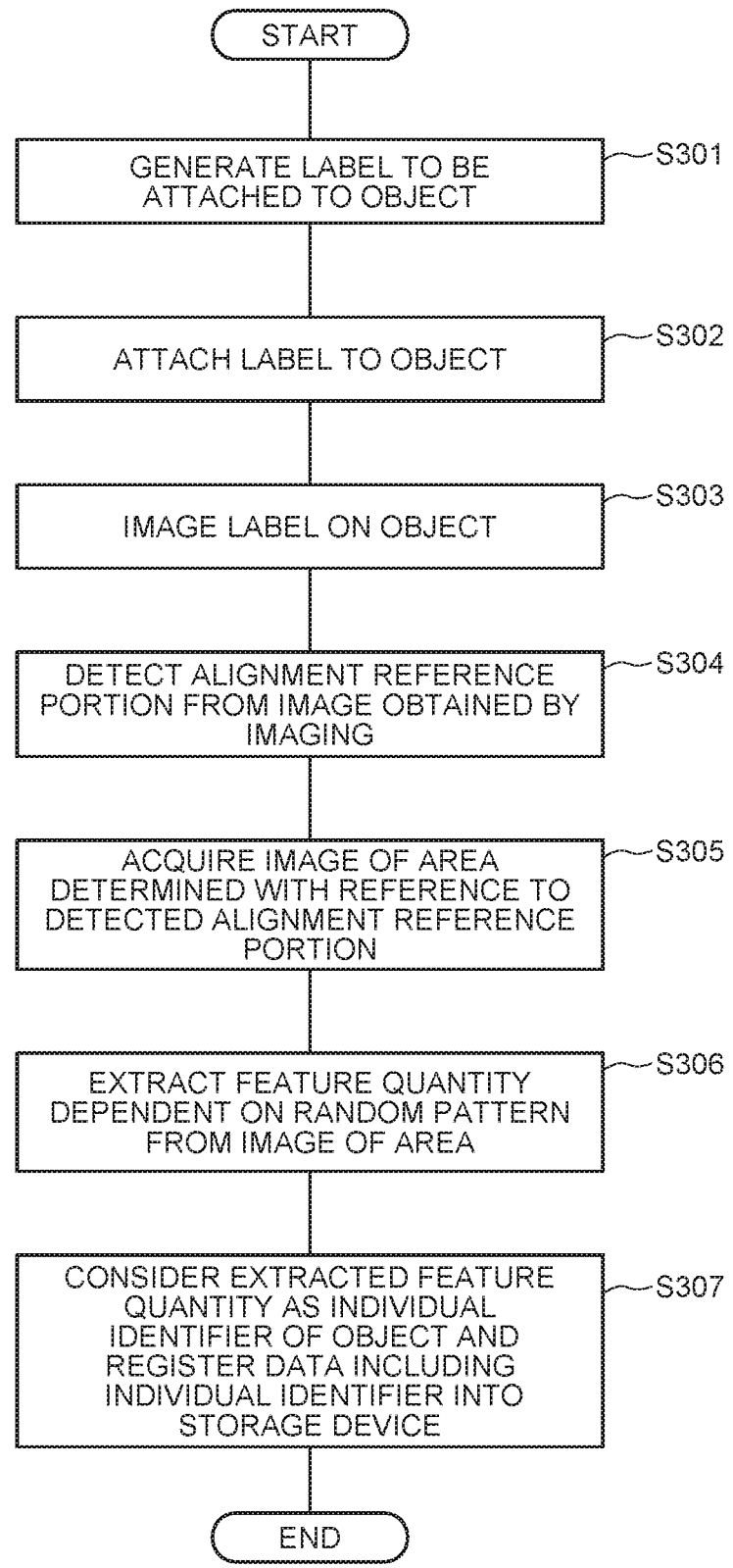
FIG. 10 is a flowchart showing a procedure of an individual identifier registration method executed by the individual identifier registration device according to the third exemplary embodiment of the present invention.

FIG. 10 is a flowchart showing a procedure of an individual identifier registration method executed by using the individual identifier registration device 300. Below, operation of the individual identifier registration method according to the third exemplary embodiment will be described with reference to FIGS. 9 and 10.

First, the generation part 303, the imaging part 301 and the extraction part 302 of the individual identifier registration device 300 perform the same operation as the operation at the steps S201 to S206 of FIG. 6 in the second exemplary embodiment (steps S301 to S306).

Next, the registration part 304 registers data including the feature quantity extracted by the extraction part 302 as an individual identifier of the object 310 into the storage device 320 (step S307).

FIG. 11 shows an example of data registered in the storage device 320. In this example, data including an individual identifier of an object and one or more attribute values of the object is stored in the storage device 320. For example, in a case where the object is an industrial product, a product package or the like, the attribute values are, for example a model number, a manufacturing lot number, a number of a machine, tool or the like used for processing the object, and so on. The individual identifier is a bit string of bit number N (>2).

Thus, according to this exemplary embodiment, it is possible to, after attaching the label 311 to the object 310, extract an individual identifier from the random pattern 312 on the label 311 and register it as identification information of a registered object into the storage device 320.

Fourth Exemplary Embodiment

Figure 12:
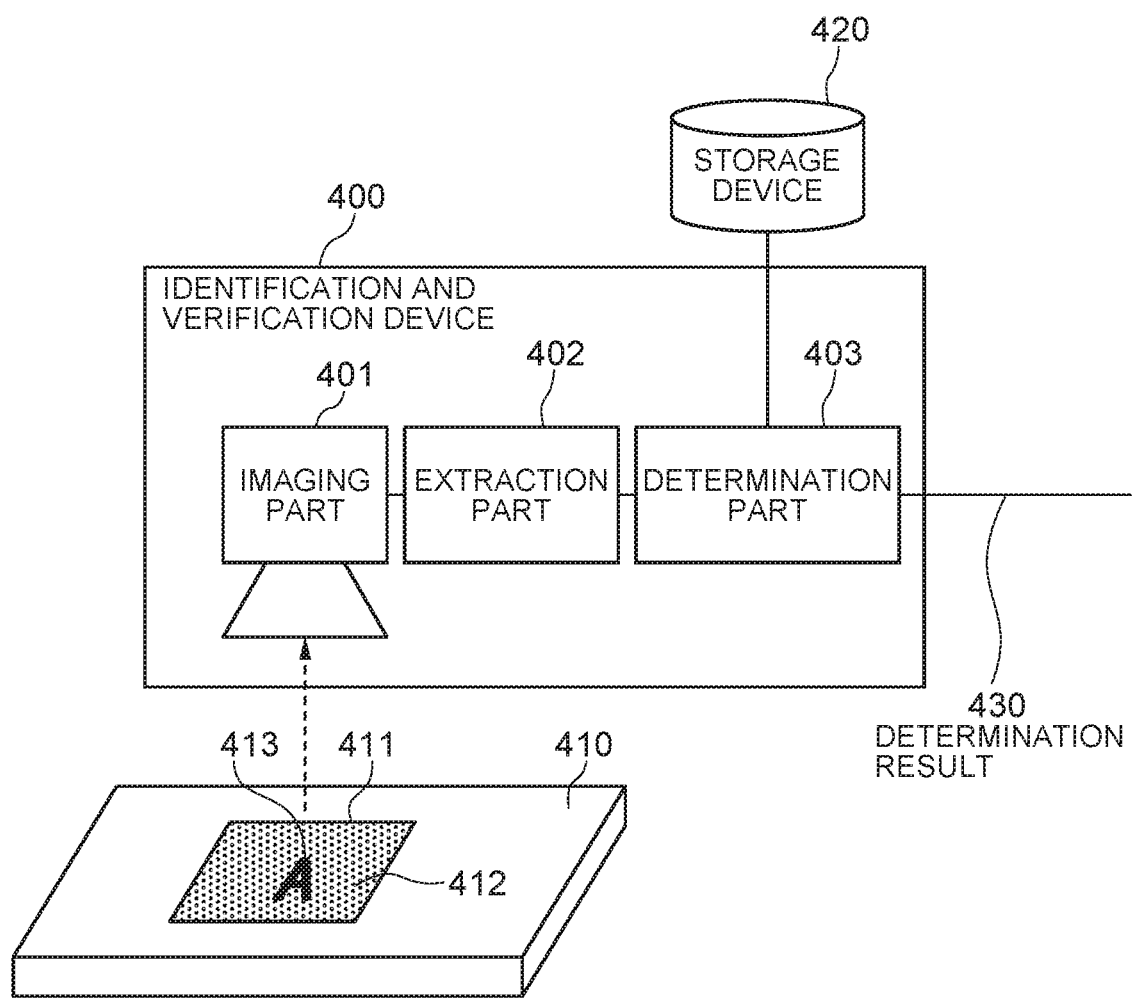
FIG. 12 is a configuration diagram of an identification and verification device according to a fourth exemplary embodiment of the present invention.

With reference to FIG. 12, an identification and verification device 400 according to a fourth exemplary embodiment of the present invention has a function to identify and verify an object 410.

The object 410 is an object that is a target to identify and verify, such as an industrial product and a product package. Moreover, the object 410 may be personal possessions (a business card, a notebook or the like) or part of an individual's body (for example, a finger).

The identification and verification device 400 has an imaging part 401, an extraction part 402, and a determination part 403. Of these parts, the imaging part 401 and the extraction part 402 have the same functions as the imaging part 301 and the extraction part 302 in the third exemplary embodiment shown in FIG. 9.

The determination part 403 has a function to compare an individual identifier of the object 410 extracted by the extraction part 402 with an individual identifier of a registered object stored in a storage device 420 and, on the basis of the result of comparison, determine identification and verification of an object. The storage device 420 is, for example, the same as the storage device 320 in the third exemplary embodiment, and data including an individual identifier of a registered object and an attribute value thereof is previously stored therein.

The identification and verification device 400, for example, as shown in FIG. 2, can be realized by the information processing device 130 including the arithmetic processing part 131 such as one or more microprocessors, the storage part 132 such as a memory and a hard disk and the camera 133, and the program 134. The information processing device 130 may be a smartphone, for example. The program 134 is loaded from an external computer-readable recording medium to the memory at the time of, for example, startup of the information processing device 130, and controls the operation of the arithmetic processing part 131 to realize functional units such as the imaging part 401, the extraction part 402 and the determination part 403 on the arithmetic processing part 131.

Figure 13:
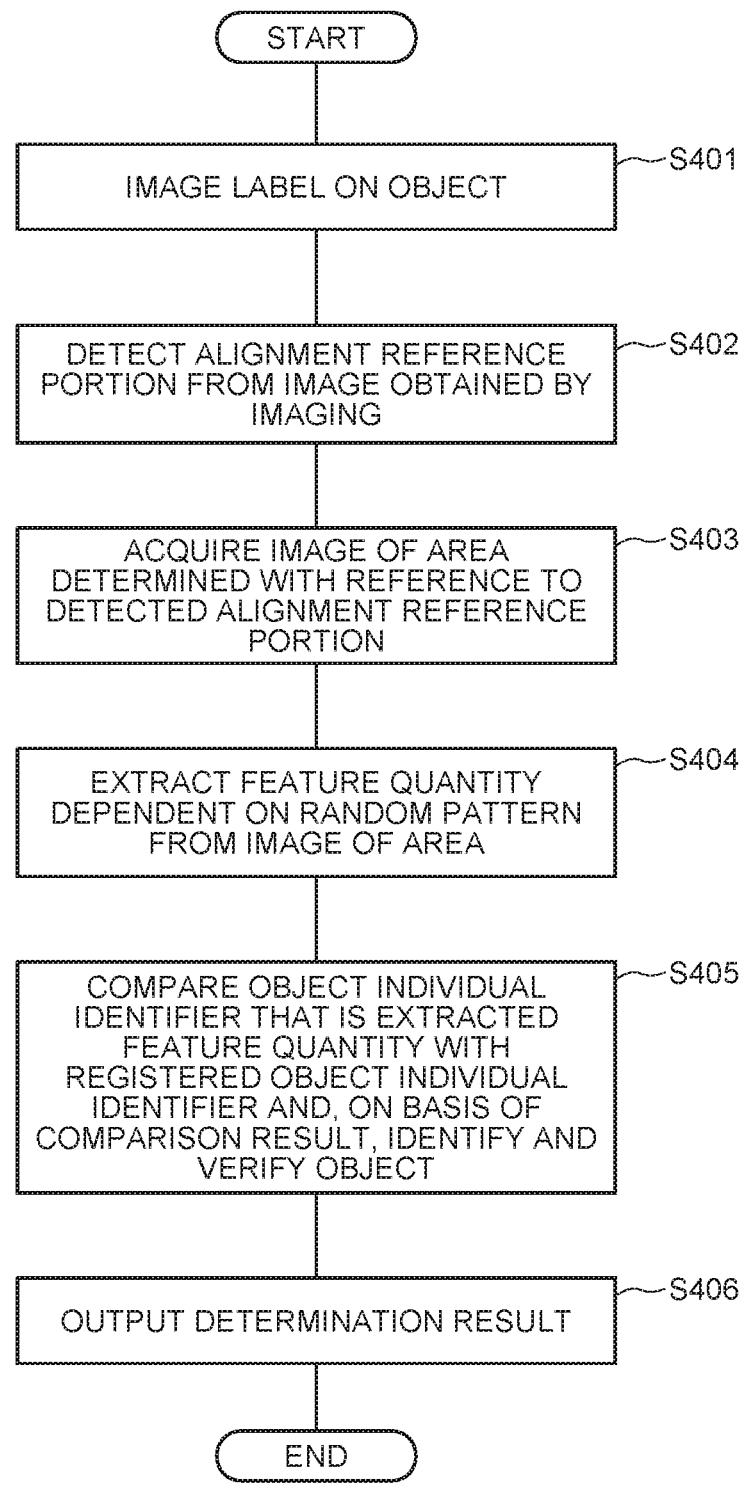
FIG. 13 is a flowchart showing a procedure of an identification and verification method executed by the identification and verification device according to the fourth exemplary embodiment of the present invention.

FIG. 13 is a flowchart showing a procedure of an identification and verification method executed by using the identification and verification device 400. Below, the identification and verification method according to this exemplary embodiment will be described with reference to FIGS. 12 and 13.

First, by the imaging part 401 and the extraction part 402 of the identification and verification device 400, the same operation as the operation at steps S101 to S104 of FIG. 3 in the first exemplary embodiment is performed (steps S401 to S404). Next, the determination part 403 of the identification and verification device 400 compares an individual identifier of the object 410 extracted by the extraction part 402 with an individual identifier of a registered object stored in the storage part 420 and, on the basis of the result of comparison, determines identification and verification of the object (step S405). For example, in a case where an individual identifier is a bit string, the determination part 403 calculates the Hamming distance between a bit string of the individual identifier of the object 410 and a bit string of the individual identifier of the registered object, and determines the two individual identifiers are identical if the Hamming distance is equal to or less than a threshold and determines they are not identical if not. The determination part 403 ends repeated determination of identification and verification of an object on condition that whichever is established first; an individual identifier of a registered object which is identical to the individual identifier of the object 410 is found, or comparison with individual identifiers of all registered objects ends. Then, the determination part 403 outputs a determination result 430 (step S406). The determination result 430 may represent whether or not identification and verification has succeeded. Moreover, when identification and verification has succeeded, the determination result 430 may include an attribute value of the object stored in the storage part 420 in association with the individual identifier of the registered object determined as identical.

Thus, according to this exemplary embodiment, it is possible to identify and verify an object by extracting an individual identifier from a random pattern 412 of a label attached to the object 410 and comparing it with an individual identifier of a registered object.

Fifth Exemplary Embodiment

Figure 14:
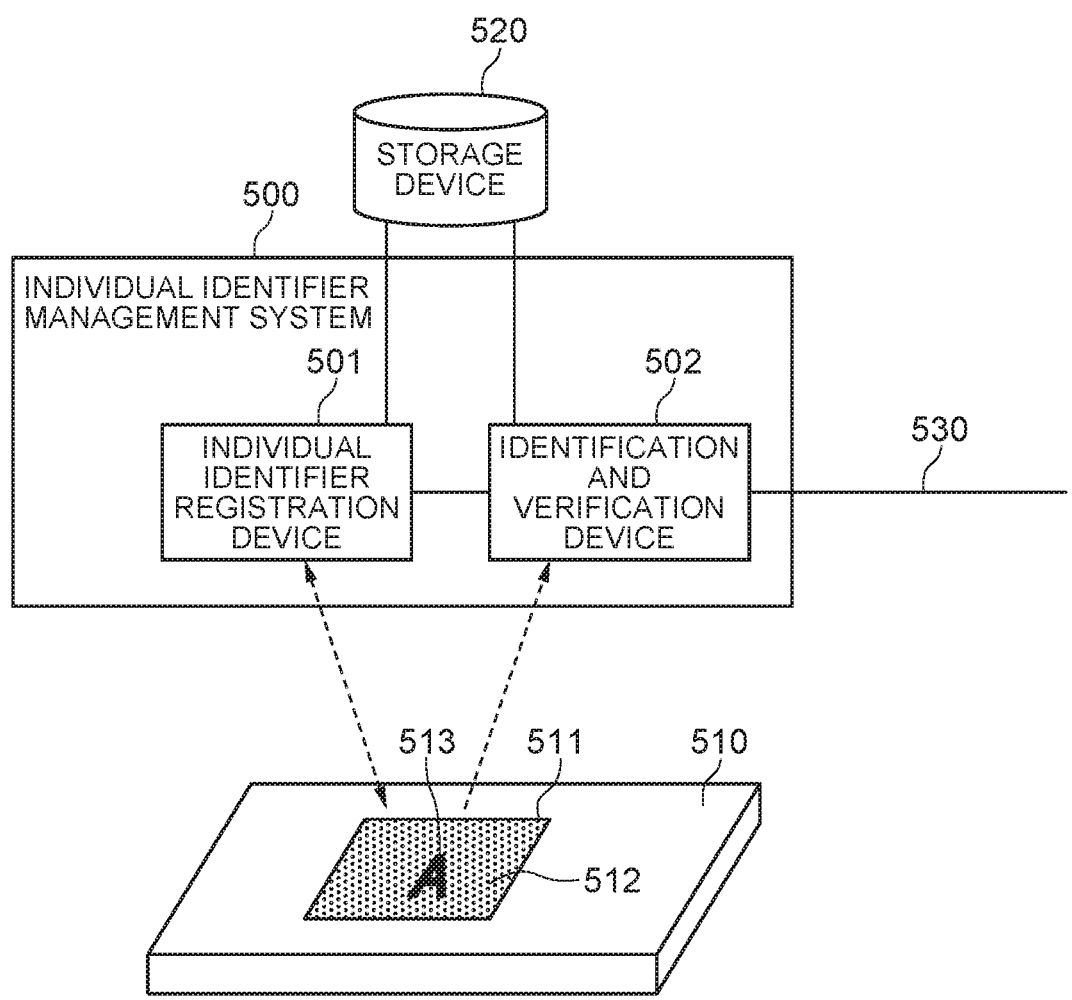
FIG. 14 is a configuration diagram of an individual identifier management system according to a fifth exemplary embodiment of the present invention.

With reference to FIG. 14, an individual identifier management system according to a fifth exemplary embodiment of the present invention has a function to manage an individual identifier for identification and verification of an object 510.

The object 510 is a target to attach and manage an individual identifier, such as an industrial product and a product package. Although only one object 510 as a target to attach and mange an individual identifier is illustrated in FIG. 14, the management target is a number of objects 510 in general.

The individual identifier management system 500 includes an individual identifier registration device 501 and an identification and verification device 502.

The individual identifier registration device 501 has: a function to generate a label 511 which is to be attached to the object 510 and includes a random pattern 512 and an alignment reference portion 513; a function to image the label 511 attached to the object 510; a function to acquire an image of an area on the label 511 determined with reference to the alignment reference portion 513 from the image obtained by imaging; and a function to extract a feature quantity of the random patter 512 as an individual identifier of the object 510 from the image of the area. The individual identifier registration device 501 is formed by, for example, the individual identifier registration device 300 according to the third exemplary embodiment of the present invention.

Further, the identification and verification device 502 has: a function to image the label 511 which is attached to the object 510 and includes the random pattern 512 and the alignment reference portion 513; a function to acquire an image of an area on the label 511 determined with reference to the alignment reference portion 513 from the image obtained by imaging; a function to extract a feature quantity of the random pattern 512 as an individual identifier of the object 510 from the image of the area; and a function to compare the extracted individual identifier of the object 510 with an individual identifier of a registered object stored in the storage device 520 and, on the basis of the result of comparison, determine identification and verification of the object. The identification and verification device 502 is formed by, for example, the identification and verification device 400 according to the fourth exemplary embodiment of the present invention.

Figure 15:
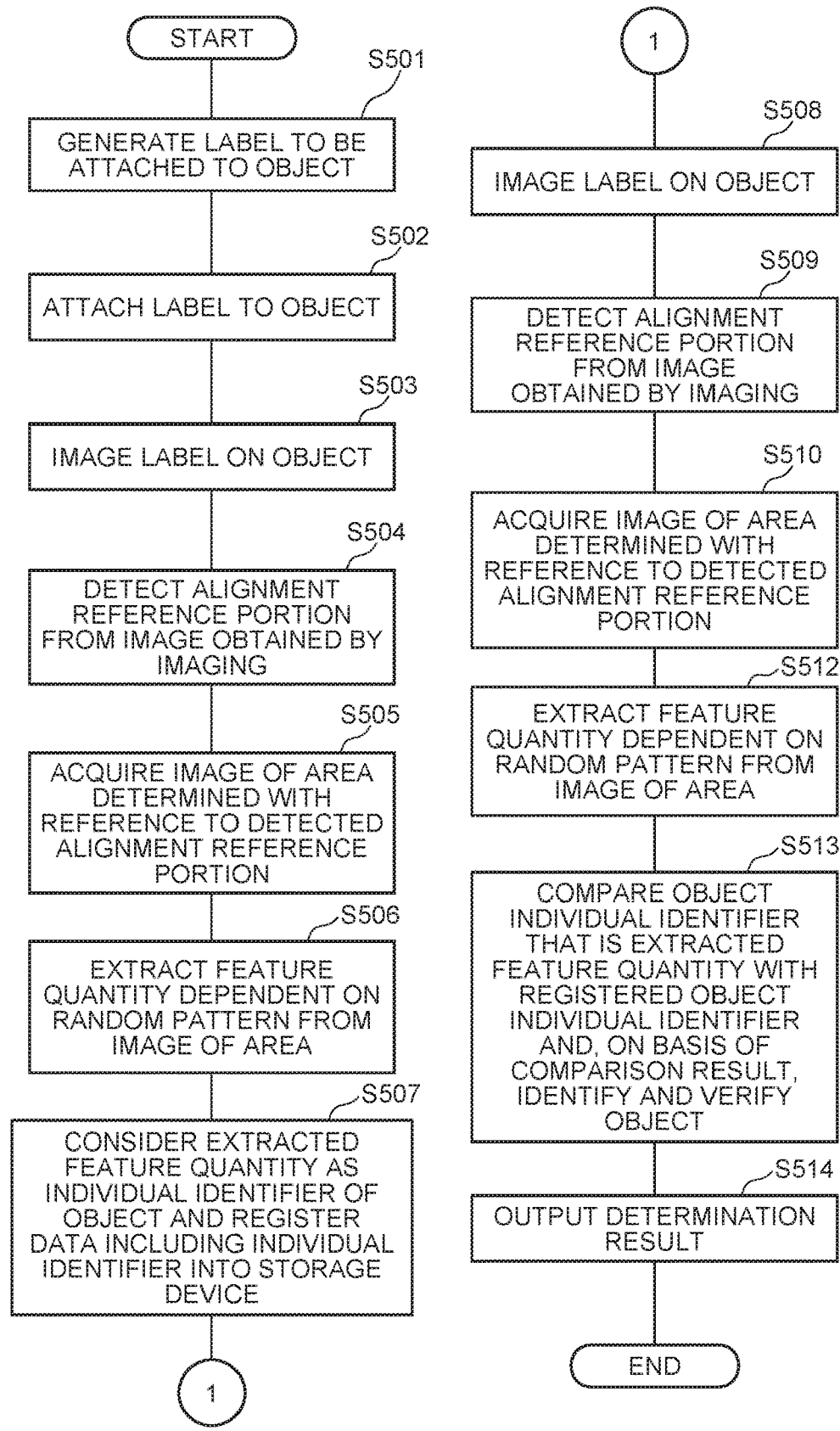
FIG. 15 is a flowchart showing a procedure of an individual identifier management method executed by the individual identifier management system according to the fifth exemplary embodiment of the present invention.

FIG. 15 is a flowchart showing a procedure of an individual identifier management method executed by using the individual identifier management system 500. Below, the individual identifier management method according to this exemplary embodiment will be described with reference to FIGS. 14 and 15.

First, the individual identifier registration device 501 generates the label 511 to be attached to the object 510 (step S501). Next, the individual identifier registration device 501 attaches the generated label 511 to the object 510 (step S502). Next, the individual identifier registration device 501 images the label 511 attached to the object 510 (step S503), and detects the alignment reference portion 513 from the image obtained by imaging (step S504). Next, the individual identifier registration device 501 acquires an image of an area determined with reference to the detected alignment reference portion 513 (step S505), and extracts a feature quantity dependent on the random pattern 512 from the acquired image (step S506). Next, the individual identifier registration device 501 considers the extracted feature quantity as an individual identifier of the object 510, and registers data including the individual identifier into the storage device 520 (step S507). The operation at steps S501 to S507 is performed in the same manner as the operation at steps S201 to S207 in the second exemplary embodiment.

On the other hand, the identification verification device 502 images the label 511 attached to the object 510 (step S508), and detects the alignment reference portion 513 from the image obtained by imaging (step S509). Next, the identification and verification device 502 acquires an image of an area determined with reference to the detected alignment reference portion 513 (step S510), and extracts a feature quantity dependent on the random pattern 512 from the acquired image (step S511). Next, the identification and verification device 502 considers the extracted feature quantity as an individual identifier of the object 510, compares it with an individual identifier of a registered object stored in the storage part 520, and performs identification and verification of the object on the basis of the result of comparison (step S512). Then, the identification and verification device 502 outputs a determination result 530 (step S513). The operation at steps S508 to S514 is performed in the same manner as the operation at steps S401 to S406 in the fourth exemplary embodiment.

In the flowchart of FIG. 15, following the processing at steps S501 to S507 by the individual identifier registration device 501, processing at steps S508 to S514 by the identification and verification device 502 is executed. However, the individual identifier management method is not limited to such a procedure, and the processing at steps S501 to S507 by the individual identifier registration device 501 may be repeatedly executed plural times on different objects 510. Moreover, the processing at steps S508 to S514 by the identification and verification device 502 may be repeatedly executed plural times on different objects 510. Otherwise, the processing at steps S501 to S507 by the individual identifier registration device 501 and the processing at steps S508 to S514 by the identification and verification device 502 may be executed in parallel on different objects 510.

Thus, according to this exemplary embodiment, it is possible to, after dynamically generating the label 511 to be attached to the object 510 and attaching it to the object 510 on the spot, extract a feature quantity from an image thereof and register it as an individual identifier of a registered object into the storage device 520. Moreover, according to this exemplary embodiment, it is possible to perform identification and verification of an object by extracting an individual identifier of the object 510 from the label 510 attached to the object 510 and comparing it with an individual identifier of a registered object.

Sixth Exemplary Embodiment

Figure 16:
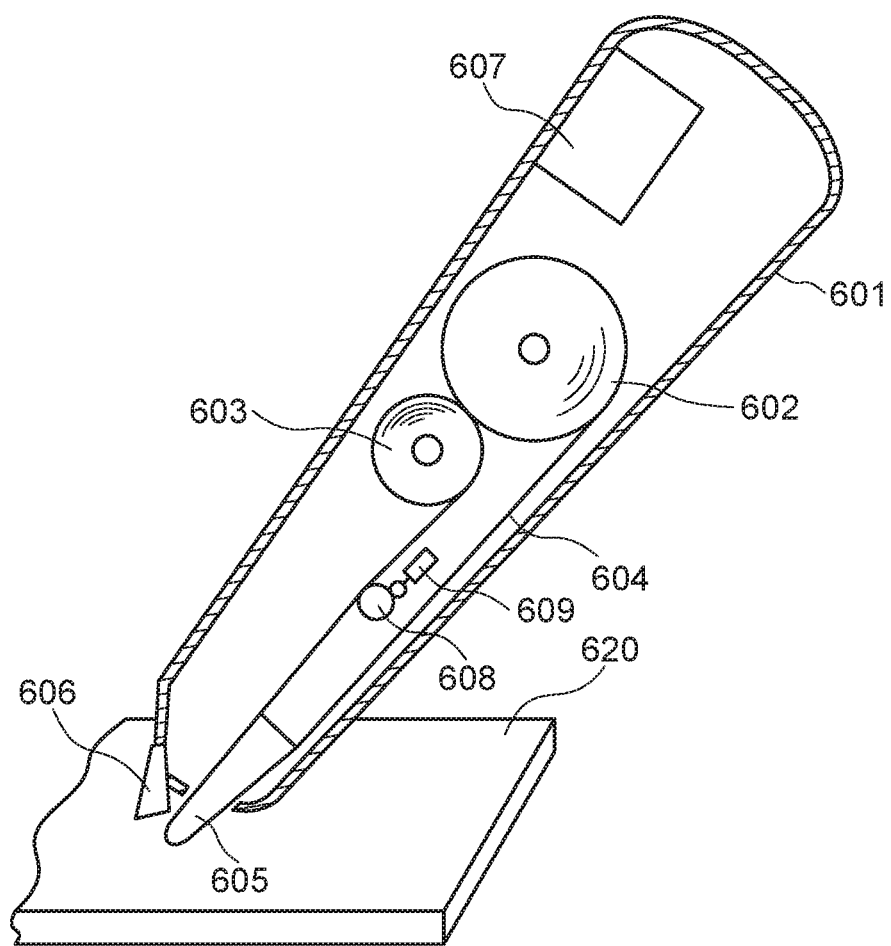
FIG. 16 is a configuration diagram of an individual identifier registration device according to a sixth exemplary embodiment of the present invention.

With reference to FIG. 16, an individual identifier registration device 600 according to a sixth exemplary embodiment of the present invention is configured so that a supply reel 602 and a roll-up reel 603 are pivotally supported in a case 601 and a tape 604 to which a random pattern layer is adhered and which is wound around the supply reel 602 is circulated and rolled up by the roll-up reel 603 through a tape guider 605 protruding at the tip of the case 601. Moreover, in order to properly give tension to the tape 604 rolled up by the roll-up reel 603 through the tape guider 605 from the supply reel 602, a rotation axis of the roll-up reel 602 is pressed by a spring or the like so as to be movable in a direction of the rotation axis of the supply reel 603. Then, when the tip of the tape guider 605 is pressed against an object 620 and moved in the course of the tape 604 exposed outside passing through the tape guider 605, the random pattern layer adhered to the surface of the tape 604 is transferred and attached to the object 620. The random pattern layer transferred and attached to the object 620 is a label attached to the object.

Further, above the tape guider 605 protruding at the tip of the case 601, an imaging part 606 that images a random pattern layer (a label) transferred and attached to the object 620 with a one-dimensional image sensor is attached, and image data obtained by imaging with the imaging part 606 is transmitted to a signal processing part 607 through a signal line that is not shown in the drawings. Moreover, the running length of the tape 604 reeled out from the supply reel 602 and rolled up by the roll-up reel 603 is detected by a roller 608 that abuts against the tape 604 and rotates and a rotary encoder 609, and a detected signal is transmitted to the signal processing part 607 through a signal line that is not shown in the drawings. The signal processing part 607 generates a two-dimensional image of the random pattern layer (the label) transferred and attached to the object 620 from the one-dimensional image data obtained by imaging with the imaging part 606 and the detected signal of the rotary encoder 609. Moreover, the signal processing part 607 extracts an individual identifier of the object 620 from the generated image of the random pattern layer (the label) and outputs it.

Figure 17A:
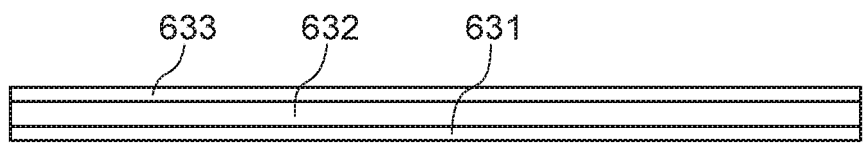
FIGS. 17A and 17B are diagrams showing a section of a tape and a plane of a random pattern layer in the individual identifier registration device according to the sixth exemplary embodiment of the present invention.

With reference to FIG. 17A showing a cross section of the tape 604, the tape 604 includes three layers; an adhesion layer 631, a random pattern layer 632, and a support 633.

The adhesion layer 631 works to stick the random pattern layer 632 to an object. For example, the adhesion layer 631 is an adhesive agent with a thickness of about 0.001 mm used for cellophane tape.

Figure 17B:
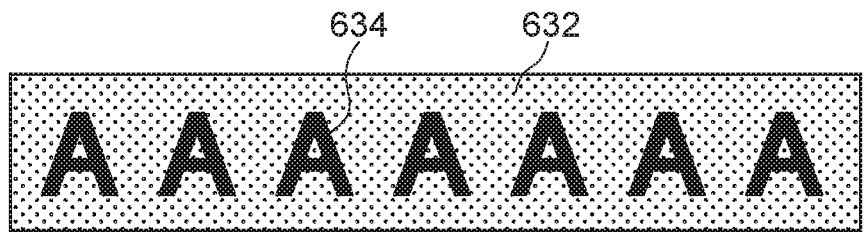

The random pattern layer 632 is made of, for example, pigment containing fine particles and resin for solidifying it and has a thickness of, for example, 0.02 to 0.03 mm. As the fine particles, fine particles such as metal powder and glass powder, taggant described in Patent Documents 1 to 3, and so on can be used. It is preferable that the fine particles are particles having a different reflection characteristic from a material forming the random pattern layer 632 (except the fine particles). Moreover, it is preferable that the fine particles are ununiformly contained by the random pattern layer 632. Moreover, on the random pattern layer 632, alignment reference portions 634 are formed at intervals over the entire length of the tape, for example, as shown in FIG. 17B. In the example shown in FIG. 17B, a logo (logotype) of an upper-case alphabetical letter "A" is used as the alignment reference portion 634. Meanwhile, as the alignment reference portion 634, a letter other than "A", a figure, a symbol, a three-dimensional shape or a combination of the above, a combination of the above and a color, or the like can be used. However, it is preferable that a letter or the like which is not point symmetric is used as a letter or the like used as the alignment reference portion 634. The alignment reference portion 634 may be applied by, for example, printing a letter or the like on the random pattern layer 632. Moreover, it is preferable that the alignment reference portion 634 has a different reflection characteristic from that of the random pattern layer 632.

The support 633 is made of a thin plastic film or the like and has a thickness of, for example, about 0.01 to 0.04 mm.

Figure 18:
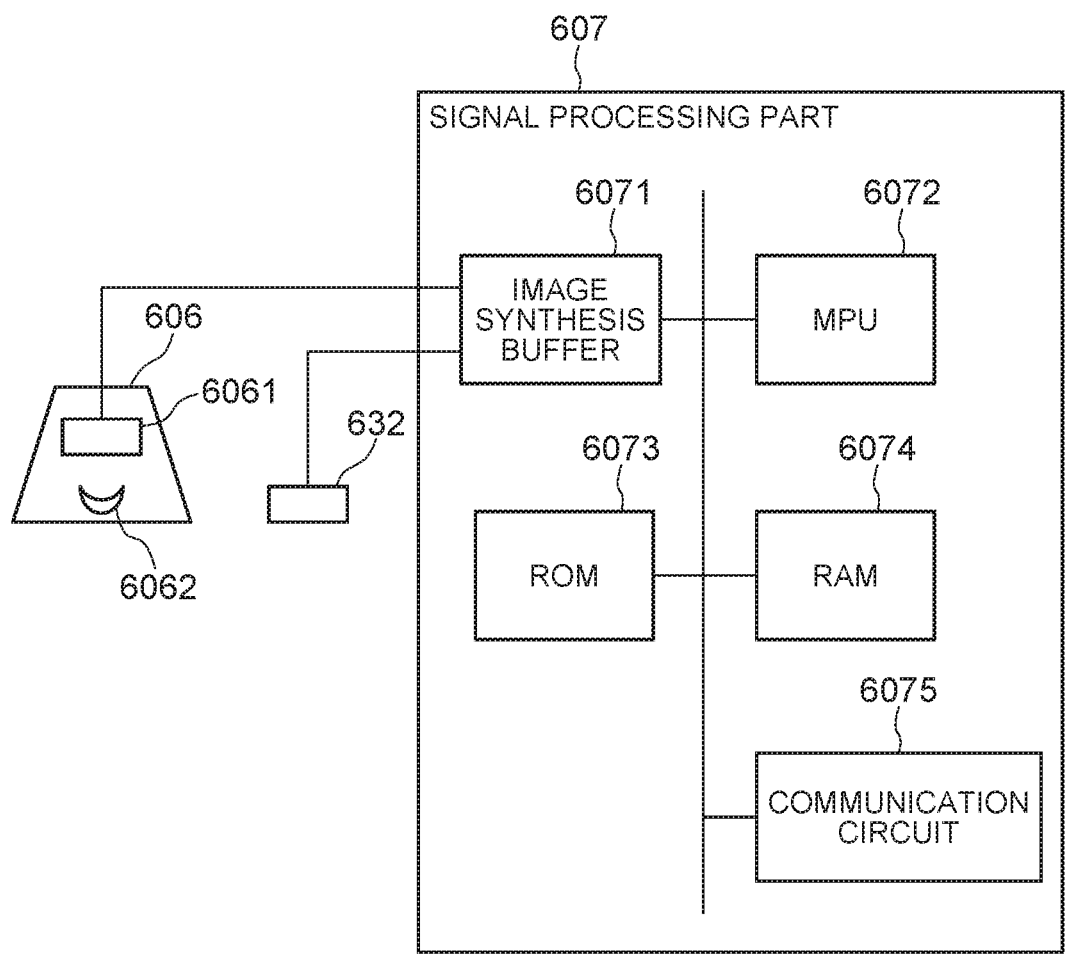
FIG. 18 is a configuration diagram of an imaging part and a signal processing part in the individual identifier registration device according to the sixth exemplary embodiment of the present invention.

FIG. 18 is a block diagram showing an example of a configuration of an imaging part 606 and a signal processing part 607. The imaging part 606 in this example is configured by a one-dimensional image sensor 6061 and a lens 6062.

Figure 19:
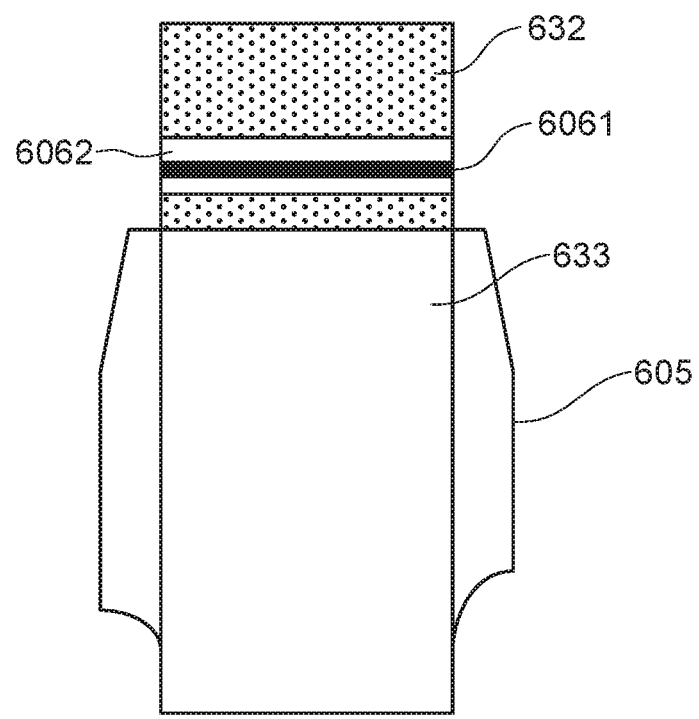
FIG. 19 is a conceptual diagram of a main part of a tip portion of a case taken from directly above in the individual identifier registration device according to the sixth exemplary embodiment of the present invention.

The one-dimensional image sensor 6061 images the random pattern layer 632 transferred and attached to the object 620 through a lens 6062 substantially directly from above as shown in FIG. 19, which is a conceptual diagram of a tip portion of the case 601 taken from directly above. An arrangement direction of photoelectric conversion elements of the one-dimensional image sensor 6061 is perpendicular to a running direction of the tape 604 (a tape longitudinal direction).

The signal processing part 607 has an image synthesis buffer 6071, an MPU 6072, a ROM 6073, a RAM 6074, and a communication circuit 6075. The image synthesis buffer 6071 synthesizes one-dimensional image data obtained by imaging with the one-dimensional image sensor 6061 and a signal corresponding to a running distance of the tape detected by a rotary encoder 609, thereby generating two-dimensional image data of the random pattern layer 630 transferred and attached onto the object 620.

In the ROM 6073, for example, a program executed by the MPU 6072 is stored. The RAM 6074 is used as an arithmetic area or the like. The communication circuit 6075 performs wireless or wired communication with an external server or the like that is not shown in the drawings. The MPU 6072 executes the program stored in the ROM 6073, thereby extracting an individual identifier of the object 620 from two-dimensional image data of the random pattern layer 632 transferred and attached onto the object 620 generated by the image synthesis buffer 6071 and transmitting the individual identifier to an external server or the like that is not shown in the drawings. A method for extracting an individual identifier of the object 620 from two-dimensional image data of the random pattern layer 632 is the same as that executed by the extraction part 102 in the first exemplary embodiment.

Thus, according to this exemplary embodiment, it is possible to dynamically generate a label to be attached to the object 620 and attach the label to the object 620 on the spot, and moreover, it is possible to image the label simultaneously with attaching and also extract an individual identifier.

Seventh Exemplary Embodiment

Figure 20:
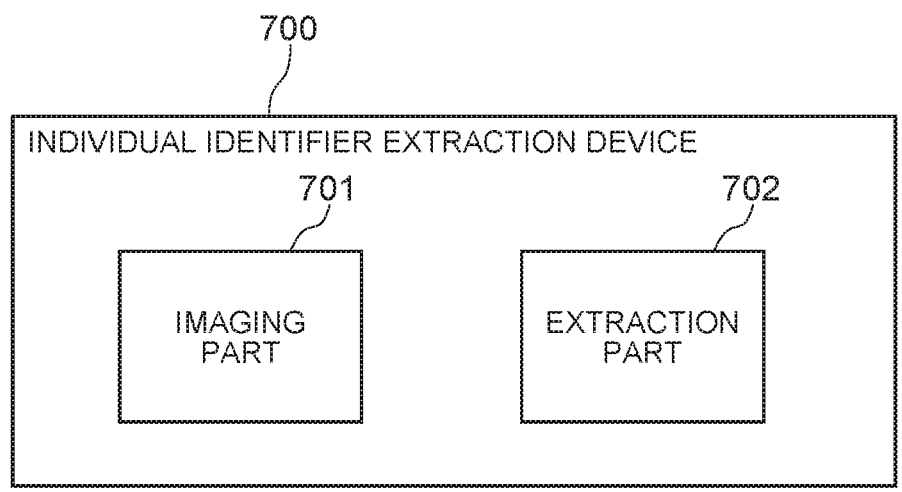
FIG. 20 is a configuration diagram of an individual identifier extraction device according to a seventh exemplary embodiment of the present invention.

With reference to FIG. 20, an individual identifier extraction device 700 according to this exemplary embodiment has an imaging part 701 and an extraction part 702.

The imaging part 701 has a function to image a label attached to an object and including a random pattern and an alignment reference portion. The extraction part 702 has a function to acquire an image of an area on the label determined with reference to the alignment reference portion from an image obtained by imaging with the imaging part 701 and extract a feature quantity of the random pattern as an individual identifier of the object from the image of the area.

The individual identifier extraction device 700 can be realized by, for example, as shown in FIG. 2, the information processing device 130 including the arithmetic processing part 131 such as one or more microprocessors, the storage part 132 such as a memory and a hard disk and the camera 133, and the program 134. The information processing device 130 may be, for example, a smartphone. The program 134 is loaded to the memory from an external computer-readable recording medium at the time of, for example, startup of the information processing device 130 and controls the operation of the arithmetic processing part 131, thereby realizing functional units such as an imaging part 701 and an extraction part 702 on the arithmetic processing part 131.

Figure 21:
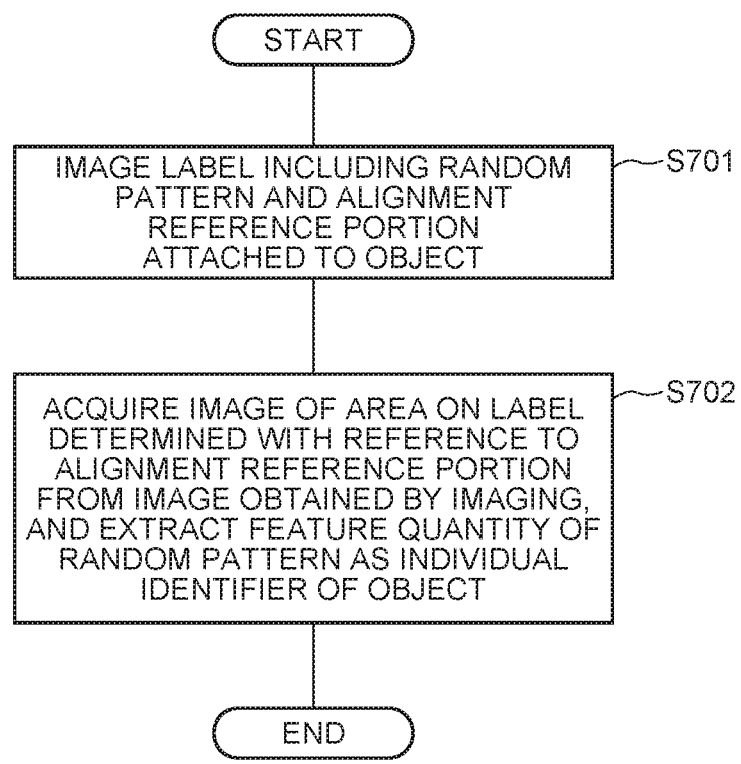
FIG. 21 is a flowchart showing a procedure of an individual identifier extraction method executed by the individual identifier extraction device according to the seventh exemplary embodiment of the present invention.

FIG. 21 is a flowchart showing a procedure of an individual identifier extraction method executed by using the individual identifier extraction device 700. Below, the individual identifier extraction method according to this exemplary embodiment will be described with reference to FIGS. 20 and 21.

First, the imaging part 701 of the individual identifier extraction device 700 images a label including a random pattern and an alignment reference portion attached to an object (step S701). Next, the extraction part 702 acquires an image of an area on the label determined with reference to the alignment reference portion from an image obtained by imaging with the imaging part 701, and extracts a feature quantity of the random pattern as an individual identifier of the object from the image of the area (step S702).

Thus, this exemplary embodiment can be universally applied to plural kinds of objects having different outer shapes and sizes from each other, and an individual identifier extraction device and method can be obtained. This is because a label to be attached to an object is provided with an alignment reference portion.

Further, according to this exemplary embodiment, even if a face of an object on which a label is attached has a color, a material, a pattern or the like that is hard to be visually distinguished from a random pattern of the label, it is possible to extract an individual identifier without difficulty. This is because in this exemplary embodiment, it is not required to specify an image of the entire label and, if an alignment reference portion on the label can be specified, it is possible to acquire an image of an area on the label to extract a feature quantity with reference to it.

Eighth Exemplary Embodiment

Figure 22:
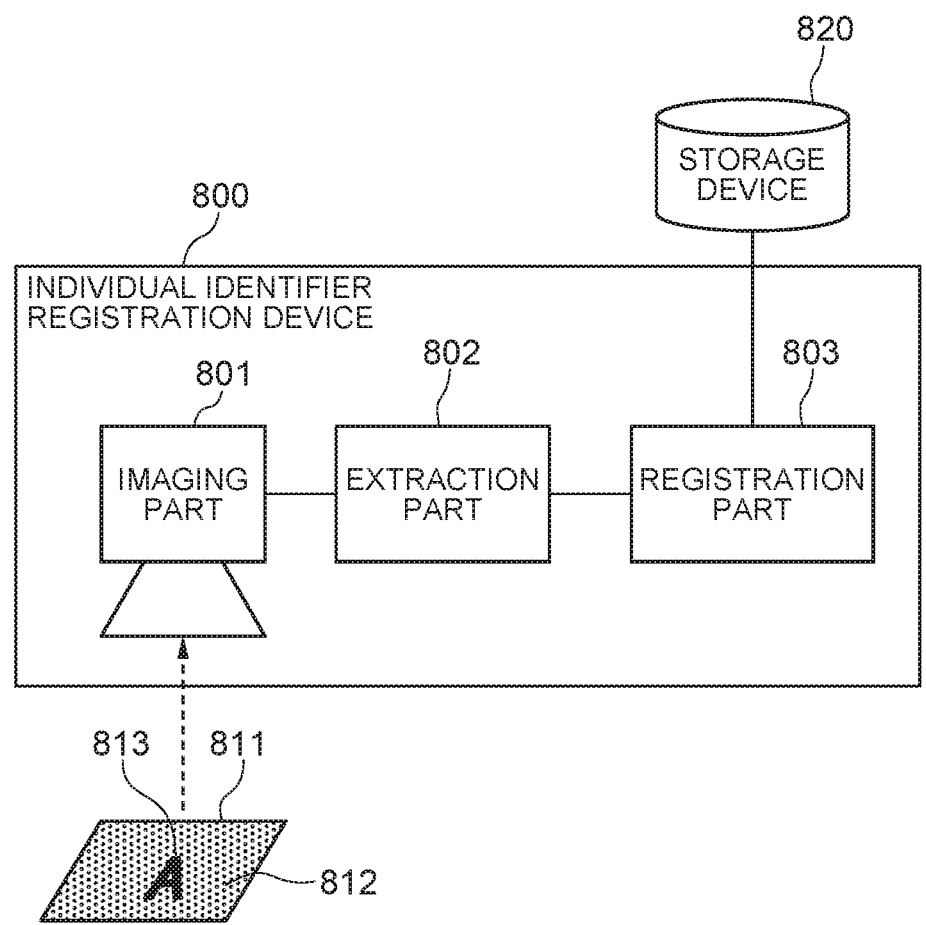
FIG. 22 is a configuration diagram of an individual identifier registration device according to an eighth exemplary embodiment of the present invention.

With reference to FIG. 22, an individual identifier registration device 800 according to an eighth exemplary embodiment of the present invention has, as major function parts, an imaging part 801, an extraction part 802, and a registration part 803.

The imaging part 801 has a function to image a label 811. The imaging part 801 images the label 811 at a predetermined angle. For example, the imaging part 801 images the label 811 from directly above.

The label 811 has a random pattern 812 and an alignment reference portion 813 on a face opposite a face attached to an object. The random pattern 812 and the alignment reference portion 813 are the same as the random pattern 112 and the alignment reference portion 813 of the label 111 shown in FIG. 1. The label 811 may be, for example, a piece of tape of the tape 237 generated by the generation part 203 shown in FIG. 7. Moreover, the label 811 may be created by cutting a large sheet with the random pattern 812 formed and a number of alignment portions 813 arranged on one face.

The extraction part 802 has a function to acquire an image of an area on the label 811 determined with respect to the alignment reference portion 813 from an image obtained by imaging with the imaging part 801. Moreover, the extraction part 802 has a function to extract a feature quantity of the random pattern 812 as an individual identifier of an object to which the label 811 is attached from an image of an area.

The registration part 803 has a function to assign a serial number to an individual identifier extracted by the extraction part 802 and store it into the storage part 820.

Figure 23:
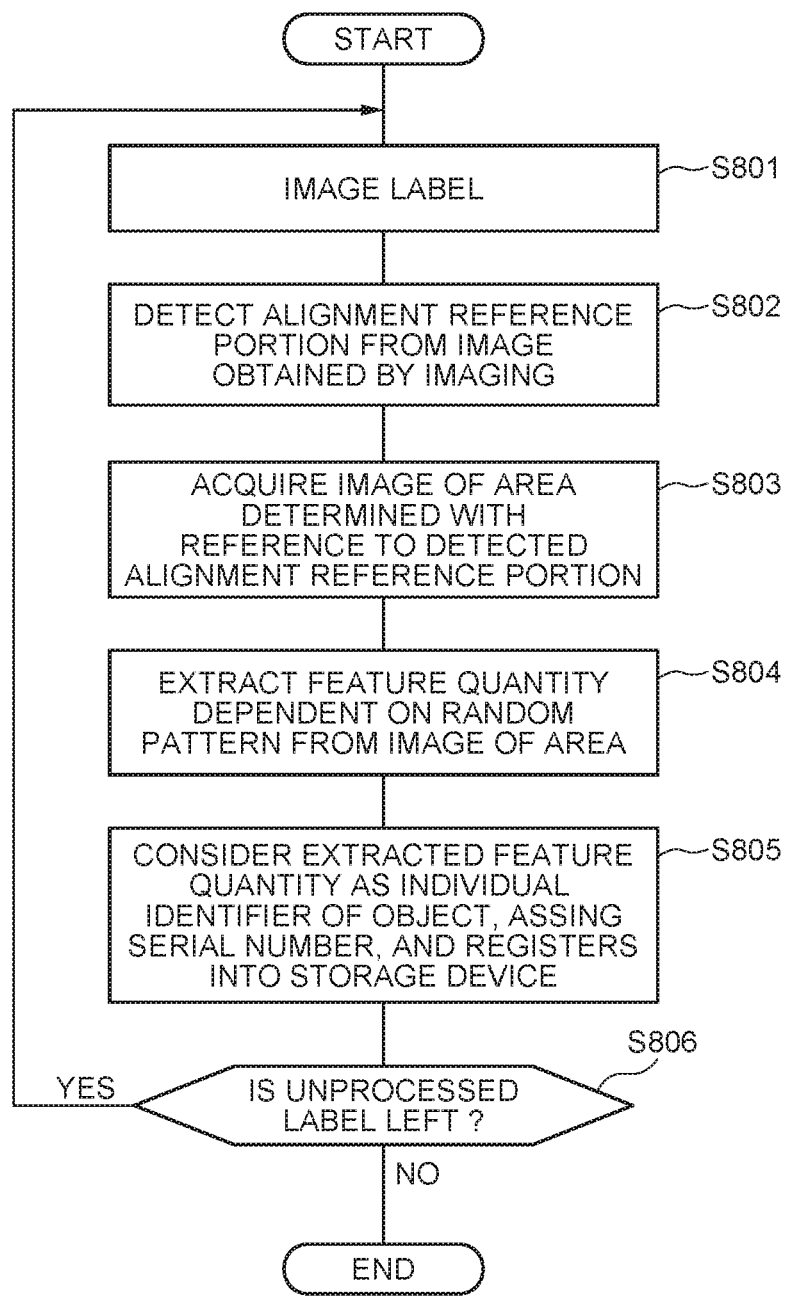
FIG. 23 is a flowchart showing a procedure of an individual identifier registration method executed by the individual identifier registration device according to the eighth exemplary embodiment of the present invention.

FIG. 23 is a flowchart showing a procedure of an individual identifier registration method executed by using the individual identifier registration device 800. Below, the operation of the individual identifier registration method according to the eight exemplary embodiment will be described with reference to FIGS. 22 and 23.

First, the imaging part 801 of the individual identifier registration device 800 images the label 811 before attached to an object (S801). Next, the extraction part 802 detects the alignment reference portion 813 from an image obtained by imaging with the imaging part 801 (step S802). Next, the extraction part 802 acquires an image of an area determined with reference to the detected alignment reference portion 813 (S803). Next, the extraction part 802 extracts a feature quantity dependent on the random pattern 812 from the extracted image of the area (S804). Next, the registration part 803 considers the feature quantity extracted by the extraction part 802 as an individual identifier and stores the individual identifier with a serial number assigned into the storage device 820 (S805). The assigned serial number may be automatically assigned by the registration part 803, or may be input by an operator with a keyboard or the like. The individual identifier registration device 800 determines whether or not an unprocessed label is left and, if left, the operation returns to step S801 and the same process as mentioned above is executed again on a next unprocessed label. If not left, the operation of FIG. 23 ends.

FIG. 24 shows an example of data stored in the storage device 820. In this example, in the storage device 820, one pair of an individual identifier of an object and a serial number, or more pairs are stored.

After a pair of an individual identifier and a serial number is thus stored into the storage device 820, the label 811 is actually attached to an object.

Thus, according to this exemplary embodiment, it is possible to extract an individual identifier from the random patter 812 on the label 811 before attached to an object and register the individual identifier with a serial number associated into the storage device 820. Consequently, by using the label 811 whose individual identifier and serial number are registered in the storage device 820, it is possible to attach labels to mass-produced objects and thereby give serial numbers and individual identifiers. Then, the need for imaging the label 811 at the time of attaching a label to an object is eliminated, so that an inexpensive individual identifier assigning device can be realized. Moreover, even if wanting to manage different objects of various shapes for each individual rather than mass production, by using the registered label 811 as described above, the user does not have trouble with a terminal without a camera and, after attaching the label 811, the user only needs to register management information (for example, an asset management number, owner, inspection result, or the like) of the object with the label attached with respect to a serial number of the label 811. Therefore, a terminal does not need a camera, and it is possible to reduce data communication cost.

Although the present invention has been described above by using several exemplary embodiments, the present invention is not limited to the exemplary embodiments described above, and can be changed and modified in various manners.

The present invention is based upon and claims the benefit of priority from Japanese patent application No. 2015-196938, filed on Oct. 2, 2015, the disclosure of which is incorporated herein in its entirety by reference.

The present invention can be used in the field of identifying and verifying the identity of an object such as an industrial product and a commercial product.

The whole or part of the exemplary embodiments disclosed above can be described as, but not limited to, the following supplementary notes.

(Supplementary Note 1)

An individual identifier extraction device comprising:

an imaging part configured to obtain an image by imaging a label attached to an object, the label including a random pattern and an alignment reference portion; and an extraction part configured to acquire an image of an area on the label from the image obtained by imaging, and extract a feature quantity of the random pattern as an individual identifier of the object from the image of the area, the area being determined with reference to the alignment reference portion.

(Supplementary Note 2)

The individual identifier extraction device according to Supplementary Note 1, wherein the alignment reference portion is any of a letter, a figure, a symbol, a three-dimensional shape, a combination thereof, or a combination of these and a color.

(Supplementary Note 3)

The individual identifier extraction device according to Supplementary Note 1 or 2, wherein the alignment reference portion is any of a letter, a figure, a symbol, a three-dimensional shape, a combination thereof, or a combination of these and a color, a shape of the letter and so on being not point symmetric.

(Supplementary Note 4)

The individual identifier extraction device according to any of Supplementary Notes 1 to 3, wherein the random pattern is a layer formed on a support of the label, the layer containing fine particles.

(Supplementary Note 5)

The individual identifier extraction device according to Supplementary Note 4, wherein the fine particles have a different reflection characteristic from a material of the layer except the fine particles.

(Supplementary Note 6)

The individual identifier extraction device according to Supplementary Note 5, wherein the fine particles are ununiformly contained by the layer.

(Supplementary Note 7)

An individual identifier extraction method comprising:

obtaining an image by imaging a label attached to an object, the label including a random pattern and an alignment reference portion;

acquiring an image of an area on the label from the image obtained by imaging, the area being determined with reference to the alignment reference portion; and extracting a feature quantity of the random pattern as an individual identifier of the object from the image of the area.

(Supplementary Note 8)

The individual identifier extraction method according to Supplementary Note 7, wherein the alignment reference portion is any of a letter, a figure, a symbol, a three-dimensional shape, a combination thereof, or a combination of these and a color.

(Supplementary Note 9)

The individual identifier extraction method according to Supplementary Note 7 or 8, wherein the alignment reference portion is any of a letter, a figure, a symbol, a three-dimensional shape, a combination thereof, or a combination of these and a color, a shape of the letter and so on being not point symmetric.

(Supplementary Note 10)

The individual identifier extraction method according to any of Supplementary Notes 7 to 9, wherein the random pattern is a layer formed on a support of the label, the layer containing fine particles.

(Supplementary Note 11)

The individual identifier extraction method according to Supplementary Note 10, wherein the fine particles have a different reflection characteristic from a material of the layer except the fine particles.

(Supplementary Note 12)

The individual identifier extraction method according to Supplementary Note 11, wherein the fine particles are ununiformly contained by the layer.

(Supplementary Note 13)

A non-transitory computer-readable medium storing a program comprising instructions for causing a computer to function as:

an imaging part configured to obtain an image by imaging a label attached to an object, the label including a random pattern and an alignment reference portion; and an extraction part configured to acquire an image of an area on the label from the image obtained by imaging, and extract a feature quantity of the random pattern as an individual identifier of the object from the image of the area, the area being determined with reference to the alignment reference portion.

(Supplementary Note 14)

The non-transitory computer-readable medium storing the program according to Supplementary Note 13, wherein the alignment reference portion is any of a letter, a figure, a symbol, a three-dimensional shape, a combination thereof, or a combination of these and a color.

(Supplementary Note 15)

The non-transitory computer-readable medium storing the program according to Supplementary Note 13 or 14, wherein the alignment reference portion is any of a letter, a figure, a symbol, a three-dimensional shape, a combination thereof, or a combination of these and a color, a shape of the letter and so on being not point symmetric.

(Supplementary Note 16)

The non-transitory computer-readable medium storing the program according to any of Supplementary Notes 13 to 15, wherein the random pattern is a layer formed on a support of the label, the layer containing fine particles.

(Supplementary Note 17)

The non-transitory computer-readable medium storing the program according to Supplementary Note 16, wherein the fine particles have a different reflection characteristic from a material of the layer except the fine particles.

(Supplementary Note 18)

The non-transitory computer-readable medium storing the program according to Supplementary Note 17, wherein the fine particles are ununiformly contained by the layer.

(Supplementary Note 19)

A verification device performing verification by using an individual identifier extracted by the individual identifier extraction device according to any of Supplementary Notes 1 to 6.

(Supplementary Note 20)

An identification device performing identification by using an individual identifier extracted by the individual identifier extraction device according to any of Supplementary Notes 1 to 6.

(Supplementary Note 21)

A verification method of performing verification by using an individual identifier extracted by the individual identifier extraction method according to any of Supplementary Notes 7 to 12.

(Supplementary Note 22)

An identification method of performing identification by using an individual identifier extracted by the individual identifier extraction method according to any of Supplementary Notes 7 to 12.

(Supplementary Note 23)

An identification and verification device comprising:

an imaging part configured to obtain an image by imaging a label attached to an object, the label including a random pattern and an alignment reference portion;

an extraction part configured to acquire an image of an area on the label from the image obtained by imaging, and extract a feature quantity of the random pattern as an individual identifier of the object from the image of the area, the area being determined with reference to the alignment reference portion; and a determination part configured to compare the individual identifier of the object with an individual identifier of a registered object stored in a storage part and, on a basis of a comparison result, determine identification and verification of the object.

(Supplementary Note 24)

The identification and verification device according to Supplementary Note 23, wherein the alignment reference portion is any of a letter, a figure, a symbol, a three-dimensional shape, a combination thereof, or a combination of these and a color.

(Supplementary Note 25)

The identification and verification device according to Supplementary Note 23 or 24, wherein the alignment reference portion is any of a letter, a figure, a symbol, a three-dimensional shape, a combination thereof, or a combination of these and a color, a shape of the letter and so on being not point symmetric.

(Supplementary Note 26)

The identification and verification device according to any of Supplementary Notes 23 to 25, wherein the random pattern is a layer formed on a support of the label, the layer containing fine particles.

(Supplementary Note 27)

The identification and verification device according to Supplementary Note 26, wherein the fine particles have a different reflection characteristic from a material of the layer except the fine particles.

(Supplementary Note 28)

The identification and verification device according to Supplementary Note 27, wherein the fine particles are ununiformly contained by the layer.

(Supplementary Note 29)

An identification and verification method comprising:

obtaining an image by imaging a label attached to an object, the label including a random pattern and an alignment reference portion;

acquiring an image of an area on the label from the image obtained by imaging, the area being determined with reference to the alignment reference portion;

extracting a feature quantity of the random pattern as an individual identifier of the object from the image of the area; and comparing the individual identifier of the object with an individual identifier of a registered object stored in a storage part and, on a basis of a comparison result, determining identification and verification of the object.

(Supplementary Note 30)

The identification and verification method according to Supplementary Note 29, wherein the alignment reference portion is any of a letter, a figure, a symbol, a three-dimensional shape, a combination thereof, or a combination of these and a color.

(Supplementary Note 31)

The identification and verification method according to Supplementary Note 29 or 30, wherein the alignment reference portion is any of a letter, a figure, a symbol, a three-dimensional shape, a combination thereof, or a combination of these and a color, a shape of the letter and so on being not point symmetric.

(Supplementary Note 32)

The identification and verification method according to any of Supplementary Notes 29 to 31, wherein the random pattern is a layer formed on a support of the label, the layer containing fine particles.

(Supplementary Note 33)

The identification and verification method according to Supplementary Note 32, wherein the fine particles have a different reflection characteristic from a material of the layer except the fine particles.

(Supplementary Note 34)

The identification and verification method according to Supplementary Note 33, wherein the fine particles are ununiformly contained by the layer.

(Supplementary Note 35)

An individual identifier registration device comprising:

a generation part configured to generate a label to be attached to an object, the label including a random pattern and an alignment reference portion;

an imaging part configured to obtain an image by imaging the label attached to an object; and an extraction part configured to acquire an image of an area on the label from the image obtained by imaging, and extract a feature quantity of the random pattern as an individual identifier of the object from the image of the area, the area being determined with reference to the alignment reference portion.

(Supplementary Note 36)

The individual identifier registration device according to Supplementary Note 35, wherein the generation part is configured to generate the label by reeling out and cutting a roll-shaped tape on which the alignment reference portions are formed at intervals over an entire length of a tape surface having the random pattern.

(Supplementary Note 37)

The individual identifier registration device according to Supplementary Note 35, wherein the generation part is configured so that a supply reel and a roll-up reel are pivotally supported in a case and a tape wound around the supply reel is circulated and rolled up by the roll-up reel through a tape guider protruding at a tip of the case, the tape having a structure that a random pattern layer on which the alignment reference portions are formed at intervals over an entire length of the tape is adhered.

(Supplementary Note 38)

The individual identifier registration device according to Supplementary Note 37, wherein the imaging part is configured to image the random pattern layer transferred and attached to the object from above the tape guider, the random pattern layer being transferred and attached by moving the tip of the tape guider while pressing against the object.

(Supplementary Note 39)

The individual identifier registration device according to Supplementary Note 38, wherein the imaging part has a one-dimensional image sensor and a rotary encoder configured to generate a signal corresponding to a running length of the tape.

(Supplementary Note 40)

The individual identifier registration device according to any of Supplementary Notes 35 to 39, wherein the alignment reference portion is any of a letter, a figure, a symbol, a three-dimensional shape, a combination thereof, or a combination of these and a color.

(Supplementary Note 41)

The individual identifier registration device according to any of Supplementary Notes 35 to 40, wherein the alignment reference portion is any of a letter, a figure, a symbol, a three-dimensional shape, a combination thereof, or a combination of these and a color, a shape of the letter and so on being not point symmetric.

(Supplementary Note 42)

The individual identifier registration device according to any of Supplementary Notes 35 to 41, wherein the random pattern is a layer formed on a support of the label, the layer containing fine particles.

(Supplementary Note 43)

The individual identifier registration device according to Supplementary Note 42, wherein the fine particles have a different reflection characteristic from a material of the layer except the fine particles.

(Supplementary Note 44)

The individual identifier registration device according to Supplementary Note 43, wherein the fine particles are ununiformly contained by the layer.

(Supplementary Note 45)

An individual identifier registration method comprising:

generating a label to be attached to an object, the label including a random pattern and an alignment reference portion;

obtaining an image by imaging the label attached to an object;

acquiring an image of an area on the label from the image obtained by imaging, the area being determined with reference to the alignment reference portion; and extracting a feature quantity of the random pattern as an individual identifier of the object from the image of the area.

(Supplementary Note 46)

The individual identifier registration method according to Supplementary Note 45, comprising:

in the generating of the label, generating the label by reeling out and cutting a roll-shaped tape on which the alignment reference portions are formed at intervals over an entire length of a tape surface having the random pattern.

(Supplementary Note 47)

The individual identifier registration method according to Supplementary Note 45, comprising:

in the generating of the label, transferring and attaching part of a random pattern layer as the label to the object, the random pattern layer on which the alignment reference portions are formed at intervals over an entire length of a tape being on a tape having a structure that the random pattern layer is adhered.

(Supplementary Note 48)

The individual identifier registration method according to Supplementary Note 47, comprising:

in the imaging, imaging the random pattern layer transferred and attached to the object.

(Supplementary Note 49)

The individual identifier registration method according to Supplementary Note 48, comprising:

in the imaging, imaging the random pattern layer with a one-dimensional image sensor, generating a signal corresponding to a running length of the tape with a rotary encoder, and synthesizing one-dimensional image data obtained by imaging with the one-dimensional image sensor and an output signal of the rotary encoder, thereby obtaining two-dimensional image data of the random pattern layer.

(Supplementary Note 50)

The individual identifier registration method according to any of Supplementary Notes 45 to 49, wherein the alignment reference portion is any of a letter, a figure, a symbol, a three-dimensional shape, a combination thereof, or a combination of these and a color.

(Supplementary Note 51)

The individual identifier registration method according to any of Supplementary Notes 45 to 50, wherein the alignment reference portion is any of a letter, a figure, a symbol, a three-dimensional shape, a combination thereof, or a combination of these and a color, a shape of the letter and so on being not point symmetric.

(Supplementary Note 52)

The individual identifier registration method according to any of Supplementary Notes 43 to 51, wherein the random pattern is a layer formed on a support of the label, the layer containing fine particles.

(Supplementary Note 53)

The individual identifier registration method according to Supplementary Note 52, wherein the fine particles have a different reflection characteristic from a material of the layer except the fine particles.

(Supplementary Note 54)

The individual identifier registration method according to Supplementary Note 53, wherein the fine particles are ununiformly contained by the layer.

(Supplementary Note 55)

An individual identifier management system comprising an individual identifier registration device and an identification and verification device, wherein the individual identifier registration device has:

a generation part configured to generate a label to be attached to an object, the label including a random pattern and an alignment reference portion;

an imaging part configured to obtain an image by imaging the label attached to an object; and an extraction part configured to acquire an image of an area on the label from the image obtained by imaging, and extract a feature quantity of the random pattern as an individual identifier of the object from the image of the area, the area being determined with reference to the alignment reference portion, and wherein the identification and verification device has:

an imaging part configured to obtain an image by imaging a label attached to an object, the label including a random pattern and an alignment reference portion;

an extraction part configured to acquire an image of an area on the label from the image obtained by imaging, and extract a feature quantity of the random pattern as an individual identifier of the object from the image of the area, the area being determined with reference to the alignment reference portion; and a determination part configured to compare the individual identifier of the object with an individual identifier of a registered object stored in a storage part and, on a basis of a comparison result, determine identification and verification of the object.

(Supplementary Note 56)

The individual identifier management system according to Supplementary Note 55, wherein the generation part is configured to generate the label by reeling out and cutting a roll-shaped tape on which the alignment reference portions are formed at intervals over an entire length of a tape surface having the random pattern.

(Supplementary Note 57)

The individual identifier management system according to Supplementary Note 55, wherein the generation part is configured so that a supply reel and a roll-up reel are pivotally supported in a case and a tape wound around the supply reel is circulated and rolled up by the roll-up reel through a tape guider protruding at a tip of the case, the tape having a structure that a random pattern layer on which the alignment reference portions are formed at intervals over an entire length of the tape is adhered.

(Supplementary Note 58)

The individual identifier management system according to Supplementary Note 57, wherein the imaging part is configured to image the random pattern layer transferred and attached to the object from above the tape guider, the random pattern layer being transferred and attached by moving the tip of the tape guider while pressing against the object.

(Supplementary Note 59)

The individual identifier management system according to Supplementary Note 58, wherein the imaging part has a one-dimensional image sensor and a rotary encoder configured to generate a signal corresponding to a running length of the tape.

(Supplementary Note 60)

The individual identifier management system according to any of Supplementary Notes 55 to 59, wherein the alignment reference portion is any of a letter, a figure, a symbol, a three-dimensional shape, a combination thereof, or a combination of these and a color.

(Supplementary Note 61)

The individual identifier management system according to any of Supplementary Notes 55 to 60, wherein the alignment reference portion is any of a letter, a figure, a symbol, a three-dimensional shape, a combination thereof, or a combination of these and a color, a shape of the letter and so on being not point symmetric.

(Supplementary Note 62)

The individual identifier management system according to any of Supplementary Notes 55 to 61, wherein the random pattern is a layer formed on a support of the label, the layer containing fine particles.

(Supplementary Note 63)

The individual identifier management system according to Supplementary Note 62, wherein the fine particles have a different reflection characteristic from a material of the layer except the fine particles.

(Supplementary Note 64)

The individual identifier management system according to Supplementary Note 63, wherein the fine particles are ununiformly contained by the layer.

(Supplementary Note 65)

An individual identifier management method comprising an individual identifier registration process and an identification and verification process, wherein the individual identifier registration process includes:

generating a label to be attached to an object, the label including a random pattern and an alignment reference portion;

obtaining an image by imaging the label attached to the object; and acquiring an image of an area on the label from the image obtained by imaging, the area being determined with reference to the alignment reference portion;

extracting a feature quantity of the random pattern as an individual identifier of the object from the image of the area, and wherein the identification and verification process includes:

obtaining an image by imaging a label attached to an object, the label including a random pattern and an alignment reference portion;

acquiring an image of an area on the label from the image obtained by imaging, the area being determined with reference to the alignment reference portion;

extracting a feature quantity of the random pattern as an individual identifier of the object from the image of the area; and comparing the individual identifier of the object with an individual identifier of a registered object stored in a storage part and, on a basis of a comparison result, determining identification and verification of the object.

(Supplementary Note 66)

The individual identifier management method according to Supplementary Note 65, comprising, in the generating of the label, generating the label by reeling out and cutting a roll-shaped tape on which the alignment reference portions are formed at intervals over an entire length of a tape surface having the random pattern.

(Supplementary Note 67)

The individual identifier management method according to Supplementary Note 65, comprising, in the generating of the label, transferring and attaching part of a random pattern layer as the label to the object, the random pattern layer on which the alignment reference portions are formed at intervals over an entire length of a tape being on a tape having a structure that the random pattern layer is adhered.

(Supplementary Note 68)

The individual identifier management method according to Supplementary Note 67, comprising, in the imaging, imaging the random pattern layer transferred and attached to the object.

(Supplementary Note 69)

The individual identifier management method according to Supplementary Note 68, comprising, in the imaging, imaging the random pattern layer with a one-dimensional image sensor, generating a signal corresponding to a running length of the tape with a rotary encoder, and synthesizing one-dimensional image data obtained by imaging with the one-dimensional image sensor and an output signal of the rotary encoder, thereby obtaining two-dimensional image data of the random pattern layer.

(Supplementary Note 70)

The individual identifier management method according to any of Supplementary Notes 65 to 69, wherein the alignment reference portion is any of a letter, a figure, a symbol, a three-dimensional shape, a combination thereof, or a combination of these and a color.

(Supplementary Note 71)

The individual identifier management method according to any of Supplementary Notes 65 to 70, wherein the alignment reference portion is any of a letter, a figure, a symbol, a three-dimensional shape, a combination thereof, or a combination of these and a color, a shape of the letter and so on being not point symmetric.

(Supplementary Note 72)

The individual identifier management method according to any of Supplementary Notes 63 to 71, wherein the random pattern is a layer formed on a support of the label, the layer containing fine particles.

(Supplementary Note 73)

The individual identifier management method according to Supplementary Note 72, wherein the fine particles have a different reflection characteristic from a material of the layer except the fine particles.

(Supplementary Note 74)

The individual identifier management method according to Supplementary Note 73, wherein the fine particles are ununiformly contained by the layer.

(Supplementary Note 75)

An individual identification tape formed in a roll shape, wherein alignment reference portions are formed at intervals over an entire length of a tape surface having a random pattern.

(Supplementary Note 76)

The individual identification tape according to Supplementary Note 75, wherein the alignment reference portion is any of a letter, a figure, a symbol, a three-dimensional shape, a combination thereof, or a combination of these and a color.

(Supplementary Note 77)

The individual identification tape according to Supplementary Note 75 or 76, wherein the alignment reference portion is any of a letter, a figure, a symbol, a three-dimensional shape, a combination thereof, or a combination of these and a color, a shape of the letter and so on being not point symmetric.

(Supplementary Note 78)

The individual identification tape according to any of Supplementary Notes 75 to 77, wherein the random pattern is a layer formed on a support of the label, the layer containing fine particles.

(Supplementary Note 79)

The individual identification tape according to Supplementary Note 78, wherein the fine particles have a different reflection characteristic from a material of the layer except the fine particles.

(Supplementary Note 80)

The individual identification tape according to Supplementary Note 79, wherein the fine particles are ununiformly contained by the layer.

(Supplementary Note 81)

An individual identifier registration device comprising:

an imaging part configured to obtain an image by imaging a label including a random pattern and an alignment reference portion;

an extraction part configured to acquire an image of an area on the label from the image obtained by imaging, and extract a feature quantity of the random pattern as an individual identifier of an object to attach the label from the image of the area, the area being determined with reference to the alignment reference portion; and a registration part configured to assign a serial number to the individual identifier of the object and store into a storage part.

(Supplementary Note 82)

An individual identifier registration method comprising:

obtaining an image by imaging a label including a random pattern and an alignment reference portion;

acquiring an image of an area on the label from the image obtained by imaging, and extracting a feature quantity of the random pattern as an individual identifier of an object to attach the label from the image of the area, the area being determined with reference to the alignment reference portion; and assigning a serial number to the individual identifier of the object and storing into a storage part.

DESCRIPTION OF NUMERALS

100 individual identifier extraction device
101 imaging part
102 extraction part
110 object
111 label
112 random pattern
113 alignment reference portion
130 information processing device
131 arithmetic processing part
132 storage part
133 camera
134 program
141 circumscribed rectangle of alphabetical letter "A" that is alignment reference portion 113
142 rectangle obtained by enlarging circumscribed rectangle
200 individual identifier registration device
201 imaging part
202 extraction part
203 generation part
210 object
211 label
212 random pattern
213 alignment reference portion
220 individual identifier
231 tape would in roll form
232 reel
233 tape holding part
234 cutting blade
235 cutting part
236 base
237 pulled out tape
242 random pattern
243 alignment reference portion
300 individual identifier registration device
301 imaging part
302 extraction part
303 generation part
304 registration part
310 object
311 label
312 random pattern
313 alignment reference portion
320 storage device
400 identification and verification device
401 imaging part
402 extraction part
403 determination part
410 object
411 label
412 random pattern
413 alignment reference portion
420 storage device
430 determination result
500 individual identifier management system
501 individual identifier registration device
502 identification and verification device
510 object
511 label
512 random pattern
513 alignment reference portion
520 storage device
530 determination result
600 individual identifier registration device
601 case
602 supply reel
603 roll-up reel
604 tape with random pattern layer adhered
605 tape guider
606 imaging part
607 signal processing part
608 roller
609 rotary encoder
631 adhesion layer
632 random pattern layer
633 support
634 alignment reference portion
6061 one-dimensional image sensor
6062 lens
6071 image synthesis butter
6072 MPU
6073 ROM
6074 RAM
6075 communication line
700 individual identifier extraction device
701 imaging part
702 extraction part
800 individual identifier registration device
801 imaging part
802 extraction part
803 registration part
811 label
812 random pattern
813 alignment reference portion
820 storage apparatus

The invention claimed is:

1. An individual identifier registration device comprising:
a camera;
a memory for storing instructions; and
at least one processor configured to execute the instructions to:
generate, using a generator, a label to be attached to an object, the label including a random pattern and an alignment reference portion on a surface thereof;
obtain, using the camera, an image by imaging the surface of the label attached to the object; and
acquire an image of an area of the surface of the label from the image obtained by imaging, and extract a feature quantity of the random pattern from the image of the area in order to extract an individual identifier of the object, the area being determined with reference to the alignment reference portion,
wherein the generator has a case pivotally supporting a supply reel and a roll-up reel, a tape wound around the supply reel is circulated and rolled up by the roll-up reel through a tape guider protruding at a tip of the case, and the tape has a structure that a random pattern layer on which the alignment reference portions are formed at intervals over an entire length of a tape surface is adhered, and
wherein the camera images the random pattern layer transferred and attached to the object from above the tape guider, the random pattern layer being transferred and attached by moving the tip of the tape guider while pressing against the object.

2. The individual identifier registration device according to claim 1, wherein the camera has a one-dimensional image sensor and a rotary encoder generating a signal corresponding to a running length of the tape.

3. The individual identifier registration device according to claim 1, wherein the random pattern is formed by a distribution of fine particles contained by a layer formed on the label, the layer containing the fine particles.

4. The individual identifier registration device according to claim 3, wherein the fine particles have a different reflection characteristic from a material of the layer except the fine particles.

5. The individual identifier registration device according to claim 4, wherein the fine particles are ununiformly contained by the layer.

* * * * *

UNITED STATES PATENT AND TRADEMARK OFFICE
CERTIFICATE OF CORRECTION

PATENT NO. : 10,628,936 B2
APPLICATION NO. : 15/764915
DATED : April 21, 2020
INVENTOR(S) : Rui Ishiyama, Toru Takahashi and Yuta Kudo Page 1 of 1

It is certified that error appears in the above-identified patent and that said Letters Patent is hereby corrected as shown below:

In the Specification

Column 12, Exemplary Embodiments, Line 17; Delete "N ($>2$)." and insert --N ($\geq 2$).-- therefor Signed and Sealed this
Fourteenth Day of July, 2020

Andrei Iancu
*Director of the United States Patent and Trademark Office*